(12) United States Patent
Hait

(10) Patent No.: US 6,462,877 B1
(45) Date of Patent: Oct. 8, 2002

(54) DROP FILTER APPARATUS AND METHOD

(76) Inventor: John N. Hait, 10776 Portobelo Dr., San Diego, CA (US) 92127

( * ) Notice: Subject to any disclaimer, the term of this patent is extended or adjusted under 35 U.S.C. 154(b) by 0 days.

(21) Appl. No.: 09/810,901

(22) Filed: Mar. 16, 2001

(51) Int. Cl.[7] .................................................. G02B 1/10

(52) U.S. Cl. ...................... 359/583; 359/109; 359/111; 359/181

(58) Field of Search .................................. 359/577, 583, 359/584, 589, 124, 127, 109, 111, 181; 333/100, 110, 132; 455/307, 130, 296

(56) References Cited

U.S. PATENT DOCUMENTS 6,185,345 B1 * 2/2001 Singh et al. ................. 359/124

OTHER PUBLICATIONS

*Theory of Everything Made Simple: The Unified Resonant Field Theory*, John N. Hait, All Optical Networks, Inc. and The Rocky Mountain Research Center, Dec. 29, 2000.

* cited by examiner

Primary Examiner—Cassandra Spyrou
Assistant Examiner—Arnel C. Lavarias
(74) Attorney, Agent, or Firm—Gary L. Eastman

(57) ABSTRACT

A method and apparatus for hyper-dense communications provides a photonic signal, such as an optical or radio frequency signal produced with substantially reduced sidebands. Signals may be filtered photonically, such as by a photonic transistor or photonic drop filter, to remove such frequency components. The resulting bandwidth of the photonic output signal is narrower in the photonic domain than the bandwidth of the information it carries in the original domain of the information. This hyper-dense signal is then transmitted and received. Such signals retain their reduced spectral distributions while in the photonic domain. Upon reception and conversion into electronic form, the full spectrum of the original information may be restored, including the sidebands, by passing the transmitted signal through a non-linear device.

15 Claims, 16 Drawing Sheets

Hyper Dense Wave Division Multiplexing

Hyper Dense Channel Separator

Hyper Dense Frequency Shifted Signals

DROP FILTER APPARATUS AND METHOD

BACKGROUND

1. The Field of the Invention

This present invention relates to the electromagnetic transmission and use of hyper-dense signals.

2. Background

The value of spectral space remains at a premium throughout the electromagnetic spectrum in both wired and wireless applications. A method of hyper-dense or ultra-narrow band transmission is needed. Wave and frequency division multiplexing of various signals would be more efficient if hyper-dense or ultra-narrow band techniques were applied to permit individual data channels to be placed closer together in the spectrum.

Moreover, chromatic dispersion has been a continuing problem for signals transmitted through dispersive media including optical fibers. As demand for bandwidth has increased, many solutions have been proposed and tried. In the attempt to reduce the bandwidth needed to transmit a given level of information, thereby reducing dispersion and increasing throughput.

Applicant theorizes that the most practical solution to the need for hyper-dense systems does not lie in the available arts. Rather, an entire re-evaluation of the fundamental processes of signal transmission is in order. From there, viable apparatus and methods can develop. The result is a new art that did not exist prior to the present invention.

BRIEF SUMMARY AND OBJECTS OF THE INVENTION

In view of the foregoing, one object of the present invention is to provide electromagnetic signals having a photonic bandwidth narrower than the bandwidth of the information they carry, constituting a hyper-dense signal and/or format.

Another object is to provide hyper-dense photonic signals so as to reduce the problems caused by chromatic dispersion.

Another object is to provide apparatus and method for extracting information from a multi-frequency signal, transforming the information into hyper-dense signals.

Another object is to provide apparatus and method for recovering information from a signal that is unusable according to the prior teaching because it has undergone dispersion of one type or another.

Another object is to provide apparatus and method for recovering the full spectral bandwidth of transmitted information transmitted and/or processed in hyper-dense format.

Another object is to provide an hyper-dense signal format that can be used to interconnect photonic components with other photonic or electronic components within multi-component devices to remove photons of unwanted frequencies.

Another object is to provide apparatus and method of recognizing hyper-dense signal by comparing a signal's spectral bandwidth in the photonic domain with the spectral bandwidth of the recovered information in the electronic domain.

The foregoing objects and benefits of the present invention will become clearer through an examination of the drawings, description of the drawings, description of the preferred embodiment, and claims which follow.

Consistent with the foregoing objects, and in accordance with the invention as embodied and broadly described herein, a method and apparatus are disclosed in one embodiment of the present invention as including apparatus and methods for hyper-dense band transmission and communications that produces a modulated photonic signal having a bandwidth more narrow than the bandwidth of the information impressed upon it. Contrary to the fundamental teachings of the prior art. Upon reception into the electronic domain, the original information having its full, original, electronically detectable, bandwidth is restored from this hyper-dense photonic signal.

This present invention has been produced directly from Applicant's hyper-dense Photonic Theory. Therefore, a precise explanation of the nature and relevant physics of the photonic phenomenon provides the basis for the invention. A modulated electromagnetic carrier wave with a substantial portion of the usual sideband energy suppressed carries all the data of the original signal formerly thought to be required by the laws of physics in order to transmit information.

One embodiment provides a photonic signal having the usual complement of sideband energy. A substantial portion of its sidebands are stripped off photonically without removing the signal from the photonic domain. The remaining hyper-dense band signal is then transmitted having the bandwidth characteristics of a photonic carrier-only signal. In another embodiment, the carrier wave is modulated photonically without producing sidebands.

When an electromagnetic wave is modulated with conventional amplitude modulation, photons of three different frequencies are commonly produced: upper sideband frequency photons, carrier frequency photons, and lower sideband frequency photons. So in the present disclosure, a photonic carrier refers to those photons that have a frequency the same as the carrier as it is usually viewed.

At the receiver, the hyper-dense band photonic signal is then converted to an electronic signal wherein the original sidebands are reconstructed.

As a result, many more wave-division, multiplexed signals can be packed into a given spectrum. Chromatic dispersion is substantially reduced when signals of the present invention are transmitted through optical fiber and other dispersive media, thus increasing the throughput in time division multiplexing systems, and as intercommunications between photonic devices both at long distance and short.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

Figure 1:
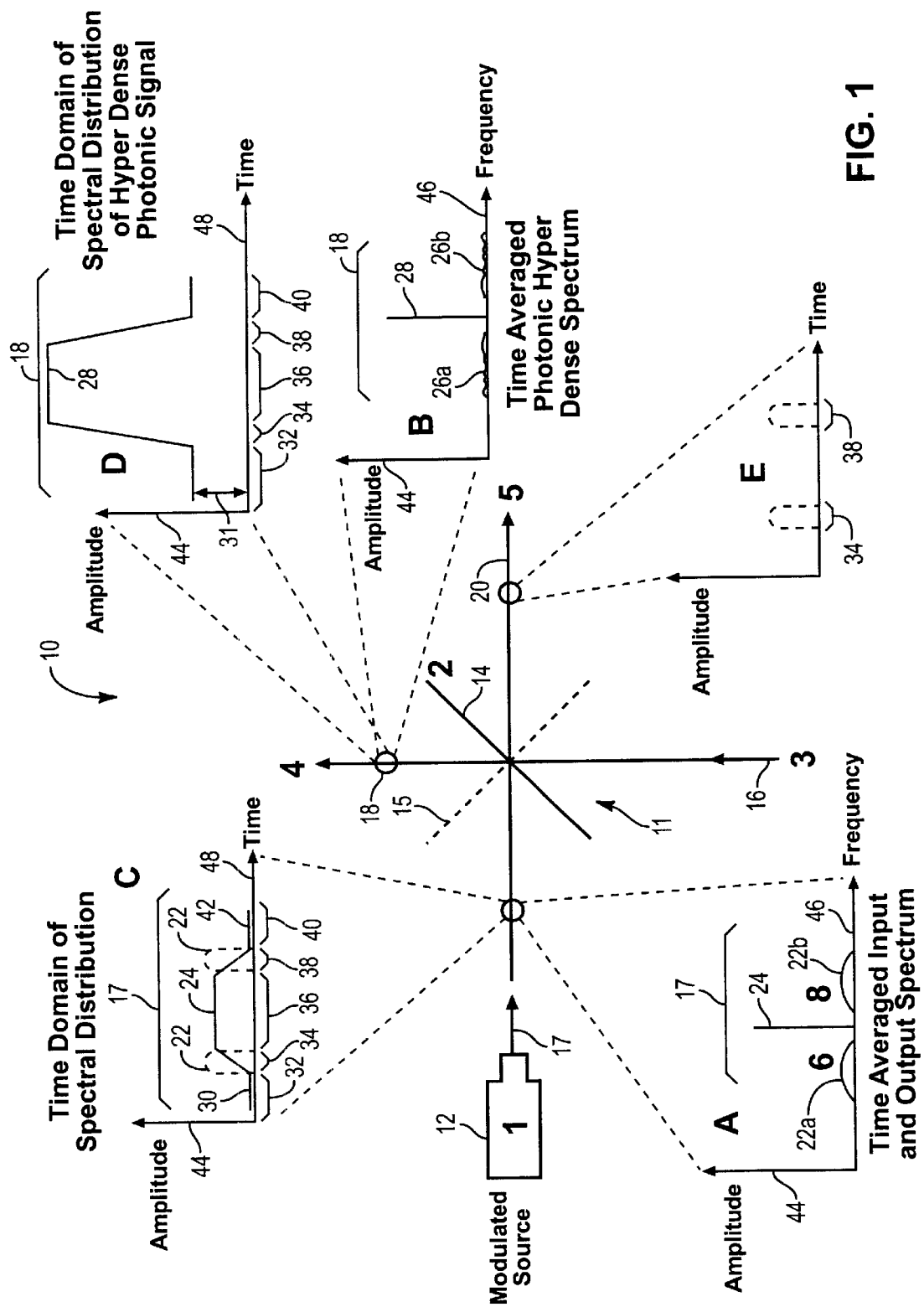
FIG. 1 is a schematic illustration of an apparatus and method in accordance with the invention for hyper-dense signal generation, encoding, and wave-division multiplexing.

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 17, is not intended to limit the scope of the invention, as claimed, but is merely representative of the presently preferred embodiments of the invention.

The presently preferred embodiments of the invention will be best understood by reference to the drawings, wherein like parts are designated by like numerals throughout.

The following description of FIGS. 1–17 is intended only by way of example, and simply illustrates certain presently preferred embodiments consistent with the invention as claimed herein.

The electromagnetic and electronic arts are accustomed to teaching electromagnetic theory based on assumptions that have grown out of the use of electronic instruments for the examination of photonic signals. The use of electronic rather than photonic means for examining electromagnetic waves has masked certain effects that are now being put to good use in the present invention. These effects are revealed through the examination of certain inconsistencies between the empirical evidence gained from fully photonic experiments and the popular electromagnetic theory that teaches against the present invention.

Engineering students in both the radio and optical arts are commonly taught that the carrier wave in an amplitude modulated photonic signal does not carry any information, but that all of the information is contained in the accompanying upper and lower sidebands. This teaching results in a belief that information cannot be transmitted within a channel that is narrower than at least one of these sidebands, which is substantially the same as the bandwidth of the information being transmitted, i.e. single sideband transmission.

These sidebands can be observed with an electronic spectrum analyzer, and can be observed optically when the optical signal has been modulated using electronic means. Thus it has been taught that a modulated signal, especially a pulsed signal, cannot be truly monochromatic, but MUST have a bandwidth at least as wide as the information imposed upon the carrier. The following example contravenes this widely-held belief.

In the customary transmission of radiotelegraph Morse code, a carrier wave is turned on when a telegrapher presses the telegraph key. It is turned off when the key is released. This is a form of binary modulation. If this on/off keying is sufficiently fast, the upper and lower sidebands that result from this amplitude modulation of the carrier can be clearly observed with an electronic spectrum analyzer. However, when the key is released, both the carrier and the sidebands turn off. When the key is pressed, the carrier comes on along with the sidebands. Therefore, the carrier itself clearly contains the binary Morse information, contrary to prior art teaching. This empirical fact opens a door for finding a truly ultranarrow band method of transmission and communications which provides hyper-dense information packing.

If the pulse repetition rate or frequency of modulation is increased, the sidebands can clearly be seen to change on an electronic spectrum analyzer while the carrier appears to be without information. But does the carrier cease blinking on and off at some certain repetition rate so that the sidebands can suddenly take over as the repository of information? Certainly not while the signal remains in the photonic domain. In order for that to occur, a means must exist for energy storage from the times when the carrier is on to the times when the carrier is off. In electronic equipment, capacitance and inductance provide that energy storage means so that the spectrum analyzer actually presents a time-averaged display rather than an instantaneous representation of the real photonic signal. This effect masks the true nature of photonic transmissions.

Electronic spectrum analyzers further mask the true nature of a photonic signal by artificially producing a spectral display in a Fourier analysis format. This gives the impression that this is what the actual photonic signal "must" look like. But the fact is that the device does not display the photonic signal directly, but manufactures the display using electronic filters. A very narrow band electronic filter is used for examining a tiny portion of the spectrum that is then swept past the filter by heterodyning.

In order to "filter" out the lower frequencies from an electronic carrier, electronic filters having capacitance and inductance (or the equivalent thereof) are used. Energy is stored from one high-frequency cycle to the next in order to cause resonation at the lower frequency. This time-averaging effect produces a lower-frequency signal. The very narrow band filter in a spectrum analyzer likewise works by storing energy from one part of the signal to another in order to manufacture the very low-frequency signal that produces the vertical portions of the display.

This process of storing energy from one cycle to the next in order to make the electronic instrument work is the reason that the physical phenomena described above have been masked for so long, because they give the impression that the photonic signal must behave just like the display pictures it. However, in the strictly free-space photonic domain, no such energy storage process exists. Consequently, the frequency components of a photonic signal are actually substantially independent quantum entities.

Photonic signals may be modulated in a variety of ways. When a photonic signal is modulated with an electronic device, the electronic effects can transfer into the photonic domain so that actual photons of different frequencies can be and of ten are produced. These can be observed separately by the use of all-photonic spectrum analysis utilizing a diffraction grating, prism, or optical frequency filter.

When these various frequency components are separated in the photonic domain, they retain their quantum character. When the fully photonic signal is filtered using photonic means, an hyper-dense signal can be extracted and transmitted having the modulation information intact even though that signal has a narrower bandwidth than the information being conveyed.

When this signal is converted into electronic form at the receiver, the capacitance and inductance in the circuits automatically stores energy from one cycle to the next. Thus, these various frequency components are reproduced by the electronics even though they were not needed in photonic transmission. Consequently, whenever a researcher looks at a signal with an electronic instrument, it appears just as the prior art teaches.

In the optical domain, it is customary to use diffraction gratings for examining spectra. Because most of the means and methods used to modulate photonic signals produce the many sidebands and because typical diffraction gratings are incapable of separating signals having a bandwidth less than about 10–25 Ghz, it is easy to see why no one has recognized the true photonic effects.

Photonic transistors use interference to amplify signals that match a reference signal while attenuating other frequencies. This process produces a very narrow band, completely photonic, dynamic filter capable of separating out specific frequencies with far greater resolution than with prior filtering techniques. This effect reveals more accurately the nature of photonic spectra. As a result of greater resolution, the actual photonic sidebands have been observed, and removed, or suppressed.

The present invention is not just an improvement over single sideband transmission; rather, it uses this photonic phenomenon to produce much narrower transmission bandwidths.

The present invention provides apparatus and methods of accomplishing hyper-dense transmission and reception of electromagnetic signals. Conventional modulation and transmission techniques usually produce a modulated bandwidth at least as wide as the bandwidth of the information modulated onto the carrier. The present invention uses photonic filtering to suppress or remove certain frequency components directly from a modulated electromagnetic signal. The suppressed frequencies are not actually required for photonic transmission. Alternatively, direct photonic modulation of the photonic carrier may produce a photonic signal having a bandwidth narrower than the bandwidth of the information modulated onto it.

The hyper-dense electromagnetic signal is then transmitted to a receiver where it can be photonically separated from other hyper-dense signals. After reception, any frequency components needed by the receiver are recreated at the receiver by time-averaging the energy either in the electronic domain, through the use of non-linear optics, or by specific photonic circuitry.

Several advantages accrue to communicating large amounts of information with hyper-dense signals. Some of these advantages include reduced chromatic dispersion in optical fiber, less interference in wireless communications, and more channels in wave division multiplexing systems.

A modulated electromagnetic energy source, modulated with information, produces a first frequency component, such as a carrier wave, along with unwanted sideband frequencies. Sidebands include at least one second frequency component. The signal may be directed into a photonic transistor. The other photonic transistor input is a narrow band continuous wave having that same first frequency. Constructive interference is produced in the transistor with the desired first frequency component to produce an output having its desired first frequency component amplified.

However, since the unwanted second frequency component does not have a matching reference frequency, constructive interference does not enhance it. Filtering using interference-based devices occurs because any signal that is not at the same frequency as the reference beam input has a continuously-changing phase relationship that causes the energy redistributions that result from constructive interference to exit first through one output and then through the second output according to the beat frequency between the two. If the signals are sinusoidal, then a 50% duty cycle exists due to the beat frequency. Consequently, the energy of signals at zero-beat with the reference are directed into one output, where signals not at zero-beat divide their energy between the two outputs.

Also, evidence exists that the quantum nature of photonic signals will enhance this filtering effect. Thus, the energy of photonic signals is split, yielding an attenuated second frequency component. Therefore, the output is a hyperdense signal derived by photonically separating the first frequency, the modulated carrier, from the second frequency (frequencies) sidebands using purely photonic apparatus and methods.

FIG. 1 is simply a basic active filter layout. Many photonic filters may require many stages in order to substantially reduce the unwanted frequency components. While the carrier may be thought of as the "desired frequency component", tuning a reference frequency can match any other frequency component. Any selected frequency can be amplified while the others are attenuated. Since the sideband energy is redundant, such a photonic filter can separate any one, or a group, of frequencies and still retain the original modulated information.

By properly adjusting input beams, a partially reflecting mirror, a hologram, or even a piece of plain glass can be a photonic transistor. The photonic transistor may be positioned and oriented so that substantially all of the energy in the constructive interference region is directed to an output while substantially all of the destructive interference region is directed to another output. In this case the partially reflecting surface provides both the beam combining optics and the required fringe component separation. A holographic photonic transistor may also be used.

Photonic transistors do not constitute the only way by which a spectrum may be filtered to produce a hyper-dense photonic signal. In some cases prisms, diffraction gratings, and other optical elements are sufficient. However, the photonic transistor provides active filtering, because its resolution and filtering frequency are dependent upon the frequency of reference input rather than the typical passive optical qualities of Fabry-Perot, Bragg gratings and other filters.

According to Applicant's theory, the modulated photonic input contains redundant information as photons having distinct frequencies that are modulated simultaneously. Therefore, the photonically-filtered hyper-dense photonic output retains the modulated information even though its conventional complement of sidebands is suppressed or substantially removed. The amplitude of the carrier is not constant and informationless, like the DC signals that are typically graphed in the prior art. Such DC signals are time-varying in accordance with the information modulated onto them.

Figure 2:
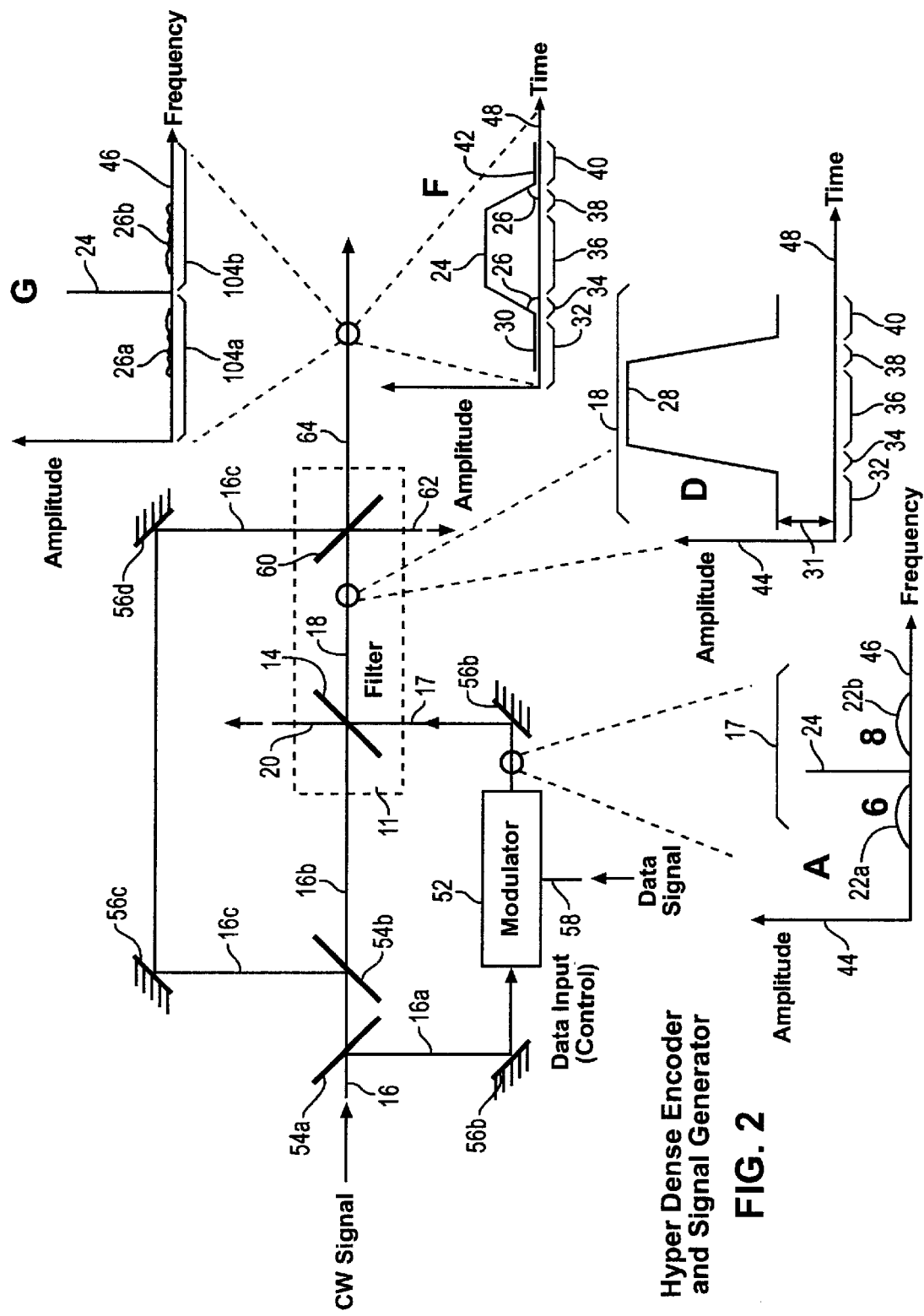
FIG. 2 is a schematic illustration of a hyper-dense encoder and signal generator.

Referring to FIG. 2, another embodiment may produce hyper-dense pulses using conventional electro-optical equipment. A continuous wave photonic source is split by a beam splitter 54a. A portion of the energy is directed through a modulator 52 (which can be an electro-optical modulator) by a mirror 56b to provide the carrier signal at the first frequency. This CW signal may be modulated in the conventional fashion using the information input 58. The modulated output containing the first frequency carrier 24 plus the second frequency sidebands 22 is directed toward photonic transistor 14 by a mirror 56b. Also, the photonic transistor has a CW input of energy 16 from a source at the first frequency.

Constructive interference within the photonic transistor between the carrier 24 and the CW 16 input directs the carrier (first frequency) energy plus a constant CW bias 31 at the first frequency 18, into a second photonic transistor 60. Meanwhile, a substantial portion of the sideband energy, not having a frequency-matched reference, exits the photonic transistor as output 20.

Another CW portion 16c from the reference source is diverted by a beam splitter 54b and directed into the second photonic transistor 14 by mirrors 56c, 56d. Here, constructive interference directs a substantial portion of the CW bias 31 into waste output 62. This leaves the hyper-dense modulated carrier to be output 26, less the CW bias 31, because of destructive interference in the second photonic transistor.

A conventional modulator can be interfaced with a photonic transistor photonic circuit so as to produce a hyper-dense photonic signal because all of the filtering has been done completely in the photonic domain, even though a modulator may have electronic functions that produce a carrier plus its customary sidebands photons.

Figure 3:
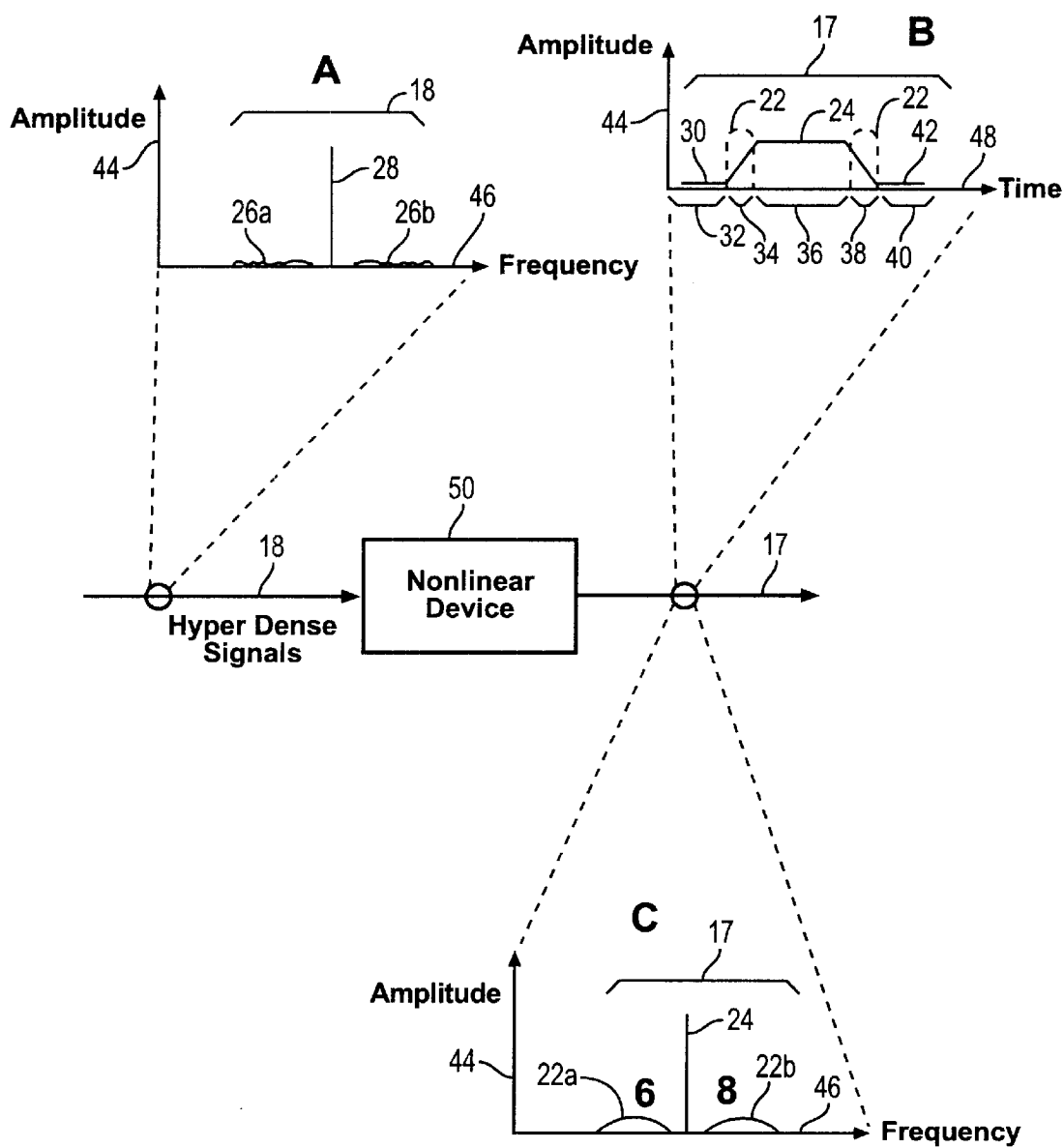
FIG. 3 is schematic block diagram of an optoelectronic receiver in accordance with the invention.

Next, consider FIGS. 3, 3A and 3B as a group. FIG. 3 is an optoelectronic receiver. FIG. 3A is a graph of the photonic spectrum input 18, viewed photonically, after having been transmitted from the apparatus of FIG. 1 where hyper-dense signal 18 retains the modulated information on carrier 28 from system 10 and continues having substantially reduced sidebands 26a and 26b.

The hyper-dense electromagnetic signal may be transmitted using any suitable apparatus to a receiver. During optoelectronic conversion, capacitance, inductance, and other photonic and/or electronic nonlinear effects rebuild whatever frequency spectrum is necessary to maintain the transmitted information in electronic form. It appears in an output having rebuilt the second frequency (frequencies) sidebands 22a, 22b along with the carrier 24. This is a natural time-averaging effect occurring in electronics based on Fourier analysis without the need for additional special circuitry.

In a Hyper-dense Communications System, an hyper-dense photonic signal is produced in the photonic domain substantially without redundant frequency components. A conventional bandwidth signal may be cleaned up by removing redundant portions of the signal. The result is a hyper-dense signal having a photonic bandwidth in the photonic domain that is narrower than the original bandwidth of the modulated information that the hyper-dense signal carries.

After transmission and reception, the hyper-dense photonic signal is converted into an electronic signal where its complement of conventional sidebands is reproduced, due to a non-linear device, completing the hyper-dense communications process.

A method in accordance with the present invention is quite straightforward the method comprises simply generating a hyper-dense signal wherein the bandwidth of the modulated information is broader than the photonic bandwidth, viewed in the photonic domain. This can be done by either generating the hyper-dense signal photonically or photonically removing the photonic sidebands.

While the signal remains purely photonic in free-space, there is no means for storing energy from the "on" periods into the "off" periods of a of/off keyed pulse train. Electronic test equipment tends to mask this true character of photonic transmissions. In the photonic domain, electromagnetic propagation is associated with a continual process of constructive interference. Electromagnetic interference is the redistribution of energy that takes place upon the superposition of two or more electromagnetic waves.

Figure 4:
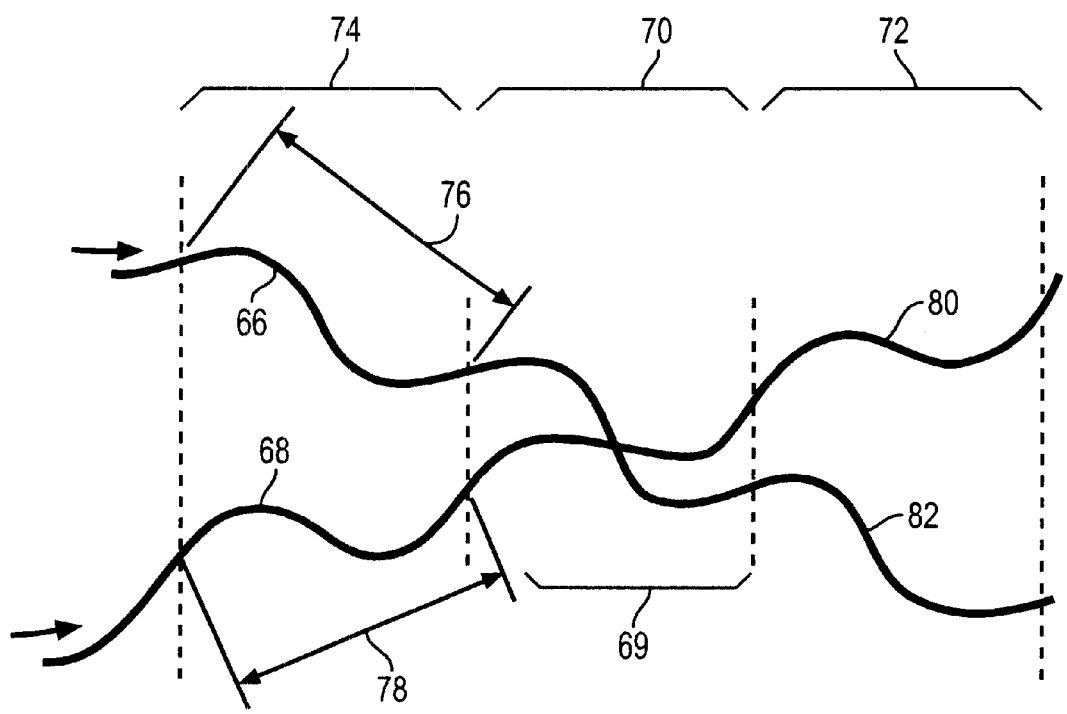
FIG. 4 is a schematic illustration of interaction of two photonic signals in accordance with the invention.

Referring to FIG. 4, the shortest theoretical pulse of a single given frequency is one cycle long 76. Photonic energy has been shown to be a quantum phenomenon. Such a pulse, therefore, contains an amount of energy that is an integer multiple of Planck's constant. It is not an analog relation. All "analog" functions of the present invention are only analog above the resolution (granularity) of quantum interactions as with all photonic activity.

That short pulse carries all of its energy with it as it travels through the vacuum of space. No known mechanism exists for storing any of its energy en route. The entire body of energy remains within the one pulse which cycles through the pulse during each period of oscillation across each distance of one wavelength. The same can be said for each and every wavelength cycle in a much longer wavetrain.

Given two identical photonic signals, even CW signals, one may consider three adjacent time-matched cycles 70, 72, 74 of each signal 66,68 interfering at a certain instant in time 70. At that time, the middle cycles 70 of each signal are superpositioned. The energy from the leading cycles 80, 82 have passed the point of superpositioning 69, and the trailing cycles 74 in each signal have yet to arrive at the point of first superpositioning 69.

Because no mechanism exists for superluminous energy transfer in (a vacuum for example) into the wavelength position of the middle cycle 70, the trailing pair of cycles 74 cannot contribute energy forward into the process of energy redistribution occurring in the middle cycles 70 at position 69.

The leading cycles 72 have already passed through the superpositioning location 69 and therefore, have already undergone energy redistribution. Since no mechanism exists for energy storage in free space, these portions 72 of the electromagnetic waves cannot supply energy to the process of redistribution currently underway at position 69 involving the middle pair of cycles 70, due to their their quantum nature.

The energy in a photon is calculated by multiplying an integer (n) times Planck's constant (h) times the frequency (v) as nhv. The amount of energy per cycle is, therefore, $nhv/v=nh$. As a result, each individual cycle has a completely quantum nature, since no analog terms remain in the formula nh. The fundamental process of photonic propagation and interference that results from superpositioning is, therefore, not analog but quantum.

Interference takes place on a cycle-for-cycle basis. If this is not the case, then photonic signals must not be quantum, for any averaging of the energy content would have to involve an analog operation. Otherwise an electromagnetic wave having only one quanta would automatically dissipate its energy back into the later cycles of a wavetrain preventing it from arriving at any distant location. Clearly single quantum waves have been observed as having arrived at the Earth after spending a considerable time traversing outer space from distant stars without any such distortion being detected.

Being a quantum phenomenon, the electromagnetic wave cannot transfer energy from one cycle to the next on its own. No known mechanism exists in free space for storing energy from one cycle to the next, let alone through the many cycles required to store energy from one "on" time of a binary modulated pulse into its "off" time. A photonic wave cannot time-average without the assistance of some energy storing medium such as a nonlinear device. As a result of light's quantum nature, the entire signal (sidebands 22 and carrier 24) turns on and off with the modulated information if the signal was initially created having each of these frequency components in the photonic domain. This is also true of analog modulation.

Ordinary amplitude modulation is a form of mixing wherein upper and lower sidebands are combined with carrier wave to produce the familiar amplitude-modulated spectrum. However, in the photonic domain, a hyper-dense signal may be produced by suppressing or removing the photonic sidebands 22 leaving the modulated carrier 28. The existence of that one frequency of energy does not mean that the photonic sideband signals will automatically come into existence again in the photonic domain. For such mixing to again take place, some form of energy storage or photonic signal-to-signal pumping is required to transfer energy from one photonic frequency to another.

Another reason why hyper-dense signals can be produced is that quantization of the electromagnetic wave is also specific-frequency dependent. The formula, nhv, does not allow for multiple frequencies. Each individual photon frequency carries its own independent information once the modulated wave becomes completely photonic. Each frequency in a broadband spectrum, while in the photonic domain is individually quantized as an individual photon. Therefore, for energy to be transferred from one frequency signal to another, a full exchange of energy in discrete quantized units is required, not analog, partial units. This includes the creation or reconstruction of photonic sideband signals from an information-carrying carrier signal that have been photonically stripped of its sidebands.

Empirical evidence lies in a dispersed modulated electromagnetic wave. As a result of this quantum nature, only a portion of the bandwidth commonly thought to be required to transmit information is actually needed. When used separately, each frequency component (not just the modulated carrier) can reproduce the transmitted information. Since they all blink on and off together, they are actually carrying redundant information.

When a modulated photonic signal is directed through a prism or diffraction grating, each of the individual frequencies is diverted in a slightly different direction. The effect is commonly used for spectral analysis using photonic rather than electronic equipment. As with the Morse code example, and for the reasons listed above, all of the dispersed signals essentially blink on and off together with binary information.

Conventional thinking essentially requires all such frequency components to be maintained intact for information to be transmitted. If the true laws of physics demanded that all such frequencies remain together for information to be conveyed, then separation would be physically impossible photonically. Photonic signals would hold tightly together and resist dispersion of any type, be it spatial dispersion as in the case of a diffraction grating, or temporal dispersion as in the case of an optical fiber. Chromatic dispersion is not only a demonstrated fact, but causes considerable difficulty in fiberoptic communications. The existence of chromatic dispersion is empirical evidence that different frequency components of a photonic signal separate photonically while retaining the modulated information.

Hyper-dense signals take up less phontonic spectrum and can, therefore, be transmitted at frequencies spaced much closer together than conventional modulating systems. At the receiver, they may be separated photonically before converting them into electronic form.

An electronic spectrum analyzer clearly shows the frequencies in a single signal. The use of electronic instruments masks hyper-dense modulation.

The electronic signal induced in an antenna, photodiode, or similar conductor mimics the photonic signal generating it, but is not exactly the same. When viewed on an instantaneous basis, an electronic charge takes on only one value at a time. The electronic charge does not take on all of the values represented by the many frequencies as individual variables do because it too is a quantum effect—a single variable quantum effect. In contrast, a photonic signal, such as a light beam, is able to have many quantum-effect photons of different frequencies coexisting in the same coaxial beam. An electronic signal has only one instantaneous amount of charge. Therefore, the diode output, an electronic signal, becomes a composite, no longer maintaining the quantum identity of each individual frequency of an original photonic signal. Quantum units can be physically separated in the photonic domain, whereas quantum units cannot be easily separated in the electronic domain without limiting the throughput bandwidth.

Figure 5:
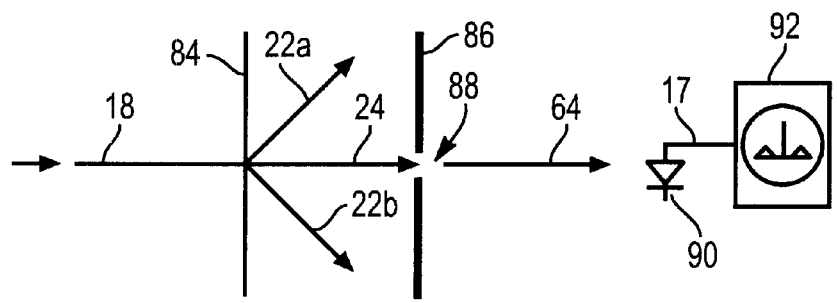
FIG. 5 is schematic illustration of a simplified alternative embodiment providing for creation of a hyper dense signal in accordance with the invention.

Referring to FIG. 5, a modulated photonic signal 18, having photon sidebands of separate quantum values and a photonic carrier, impinges on a high resolution dispersive optical element to photonically separate the upper sideband energy 22$a$ and the lower sideband energy 22$b$ from the hyper-dense carrier energy 24 by a mask 86. This hyper-dense energy signal may be transmitted to an electronic receiver 17 where the reconstructed spectrum can be displayed on electronic spectrum analyzer 92. Typically, this arrangement does not have the frequency filtering resolution of a photonic transistor. However, when sidebands are broad enough to undergo significant spatial dispersion, a reasonable amount of signal separation can be accomplished.

"Hyper-dense" signal may be thought of as a modulated photonic signal having a transmitted photonic bandwidth narrower than the bandwidth of the information impressed upon it, yet able to carry all of that information. This is contrary to a common misconception that the transmitted signal must have a bandwidth equal to or greater than the information bandwidth. If the "substantial" reduction in sideband energy leaves only some small amount of residual energy or none at all, the main body of the signal encompasses the photonic bandwidth, as measured in the photonic domain. Such small residual sideband energy is usually in the noise level.

If two or more hyper-dense signals are placed close enough together so that cross talk occurs when they are both returned into the same electronic circuit, then they need to be separated in the photonic domain before conversion into separate electronic circuits.

Different types of modulation include frequency, phase, and polarization. A variety of pulsed and non-pulsed amplitude modulations may be used with the present invention by producing a carefully controlled set of photons, even in the radio and microwave portions of the electromagnetic spectrum.

However, in the photonic realm, each photon of a different frequency represents a different variable having nhv energy. All are present at the same time, in the same space. In the case of amplitude modulation, the independent variable is "n" the number of quanta available at any one instant for each frequency of energy available. As the amplitude at any given frequency changes, n changes. Consequently, each hyper-dense signal has a different base energy, a different frequency "v". As long as these signals remain photonic, photonic devices including tuned microwave components can separate one frequency from another. After photonic separation, each separate signal can be detected to become a separate electronic signal in a separate electronic circuit. Then each signal can be expanded back into its full electronic bandwidth without suffering from cross talk.

All of the different modulation types can be used to produce hyper-dense signals having a photonic bandwidth smaller than the bandwidth of the information being transmitted. Upon reception, the various hyper-dense photonic signals can be sorted and processed photonically. Such signals may even be recombined, routed and processed. Each signal may be converted, when necessary, into a separate electronic signal having a fill spectral complement of information.

Referring to FIG. 1, an apparatus 10 may operate as a sending device or as a sender 10 for signals directed to a filter 11, which is frequency selective. The filter 11 operates in the photonic domain, and the filtering process is a photonic process.

The source 12 of the signal or energy directed toward the filter 11, may come from any modulated photonic source. In general, the source 12 generates a beam or signal that contains information by virtue of the modulation of the beam or energy.

The filter 11 may have an operational element such a photonic transistor 14. For example, a photonic transistor may incorporate a dual-vector interferometer, using either a partially reflecting mirror or glass as illustrated by the position of the photonic transistor 14, or a holographic photonic transistor 15 operating in accordance with holographic principals. The photonic transistors 14, 15 both operate on the principal of interference of photonic signals as described in detail by U.S. Pat. No. 5,093,802 issued to John N. Hait on Mar. 3, 1992 and directed to Optical Computing Method Using Interference Fringe Component Regions, and incorporated herein by reference.

An input 16 may be a continuous wave signal 16. The input signal 16 is phase and frequency matched to a carrier frequency characterizing the input signal 24 from the modulated source 12. Thus, the photonic transistor 14, 15 operates as the principal element of the filter 11 filtering the input 17 to produce an output 18 containing useful information. The output 18 is filtered by the filter 11 to reduce the sideband energy thereof. By reducing the sidebands sufficiently, hyper-dense signal 18 containing all of the data information originating from the modulated source 12 as a result of the modulation.

An output 20 necessarily contains energy filtered from the input signal 17, and may be effectively wasted. To filter the output 20 away from the energy of the output 18, either the photonic transistor 14, or the photonic transistor 15, may be relied upon. In certain embodiments, the photonic transistor 14 may be fabricated from a plain piece of glass.

Referring to FIGS. 1–2, while referring generally to FIGS. 1–13, the input 17 may include original sidebands 22 (e.g. 22a, 22b) corresponding to a modulated carrier 24. As a direct result of the filter 11, the relative energy content between original sidebands 22 of the signal 17, may be attenuated or reduced with respect to the modulated carrier thereof. The sidebands 22a, 22b and the modulated carrier 24, are illustrated graphically in the graphical blowups corresponding to the signal 17 (signal line 17) of FIG. 1. The graphical representations of the signal 17, characterized by amplitude 44 in the frequency domain 46, and as amplitude 44 in a time domain 48 illustrate the qualities of the constituent sidebands 22 relative to the carrier 24. The carrier 24 is illustrated as a pulse 24 in the time domain 48, with the sidebands 22 reflecting the transient response occurring during pulse transition times 34, 38. Ultimately, due to the filter 11, the original sidebands 22 are suppressed to leave only the suppressed sidebands 26 in the frequency domain 46 and time domain 48.

The signal 18 results in the suppressed sidebands 26 and a corresponding amplified modulated carrier signal 28. The nature of the continuous wave input signal 16 is to bias 31 the value of the carrier 28 in amplitude 44. The off-signal state 30 exists during a time period 32 during which no signal is provided. Meanwhile, the sideband 22a is generated during a time period 34 of transition during which the signal 17 transitions due to modulation from an off-state 30 through a transition time 34 to an "on" time period 36.

Similarly, a transition time 38 as the carrier 24 drops back to an off-state 42, generates a sideband 22b during the transition time 38.

The modulated data in the signal 17, is encoded as a differential between the carrier 24 during the on-time 36, and the off-state 30, during the off-time 32. Similarly, the differential between the carrier 24 during the on-time 36, and the value of the off-state 42 during the off-time 40 may similarly be thought of as representing the data as modulated into the signal 17. The sideband energy 22 during the transition times 34, 38 are not required, since the modulated data is represented by the differential. Therefore, the sidebands 22 may be removed from the signal 17, with no loss of the imposed data information from the modulated source 12.

Referring to FIG. 2, while continue to refer generally to FIGS. 1–13, the signal 17 provided to the filter 11 relies on an input signal 16 that may be a continuous wave signal 16. The signal 16 strikes a beam splitter 54a to provide the portion 16a directed to the mirror 56b. Similarly, the residual of the signal 16 passes to the beam splitter 54b, which in turn subdivides the energy thereof into the signals 16b and 16c. The signal 16a, passes to the modulator 52, controlled by the data input signal 58, or control signal 58. The modulator 52, under the control of the data input signal 58, provides the signal 17 to the mirror 56b, and ultimately to the filter 11.

The filter 11 includes the photonic transistor 14, and described above with respect to FIG. 1. The photonic transistor 14 accepts the signal 17, providing the waste output 20, and the useful output 18. The useful output 18 is directed from the transistor 14 to a second photonic transistor 60. The signal 18 is selectively directed to the photonic transistor 60 by virtue of the selectively constructive or destructive interference between the input signal 17, and the signal 16b from the splitter 54b. Accordingly, the interference phenomenon occurs in the photonic transistor 14.

Meanwhile, the signal 16c, split from the signal 16, by the splitters 54a, 54b may be directed by means of mirrors 56c, 56d to interfere at the photonic transistor 60 with the signal 18. Accordingly, the photonic transistor 60 outputs a waste output 62, and a useful output 64.

Referring to FIGS. 1–2, while continuing to refer generally to FIGS. 1–13, various signals are illustrated by the signal graphics representing signals A, B, C, D, E, F. In general, sidebands 22 corresponding to a carrier 24 are transient responses to the differential occurring between the carrier signal 24 in a time domain 46, as compared with the off-state 30 representing an amplitude 44 at a different time period 32 from the on-time period 36, in the time domain 46. Similarly, the differential between the value of the amplitude 44 of the carrier 24 during the on-state 36 and off states 32, 40 provide the necessary binary information. Meanwhile, the signals corresponding to the sidebands 22 effectively represent transient responses to the change in value of the signal 17 during the transition periods 34, 38, and are not necessary to establish the information represented by the differential between an on-state and an off-state.

The effect of the photonic transistor 14 on the signal 17, in conjunction with the signal 16, is to produce a signal 18 characterized by the graphics of B and D. The graphic B illustrates the signal 18 in the frequency domain 46, having the suppressed sidebands 26a, 26b and the corresponding amplified carrier 28. Constructive interference between the reference signal 16 and the carrier 24 of the input signal 17 results in the amplified carrier signal 28. Because the reference signal 16 has no effective signal capable of continuous interfering with the sidebands 22a, 22b of the signal 17, no corresponding interference can occur. Accordingly, no amplification or diversion of sideband energy from the sidebands 22a, 22b can occur. Accordingly, no energy from the sidebands 22a, 22b can be redirected into the useful output 18 by interference. As a direct result, the sideband energy from the sidebands 22a, 22b must pass through the photonic transistor 14 as part of the waste output 20.

A photonic transistor 14 (or optionally photonic transistor 15 as described above, in each instance) operates to a certain extent as a beam splitter. Accordingly, a portion of incoming energy may be reflected, and a portion transmitted. Accordingly, energy may be reflected without participating in any interference phenomenon. Meanwhile, the transmisivity and reflectivity of the photonic transistor 14 need not produce equal amounts of reflected energy and transmitted energy from the input signal 17. For example, if the photonic transistor 14 is made of glass, the transmisivity may be in excess of 90% of the impinging energy, while the reflectivity is substantially less than 10%. Accordingly, the sideband energy from the sidebands 22 from the signal 17 may impinge on the photonic transistor 14, reflecting only a small amount (on the order of 4%) along the path of the signal 18, while approximately 96% of the energy is transmitted through the photonic transistor 14 as part of the waste energy 20, and without participating in interference, due to the lack of a matching coherent portion of the reference signal 16, with which to interfere. One result is that the signal 18 includes an amplified carrier signal 28 containing the desired information, while the energy of the sidebands 26a, 26b (see graphic B) is suppressed.

As a practical matter, the portion of a particular spectrum from which the signals 16, 17 are selected may correspond to any suitable wavelength. Accordingly, radio frequencies, optical frequencies or other electromagnetic frequencies may be selected. Meanwhile, the properties of the photonic transistor 14 may be selected to operate within the frequencies corresponding to the signals 16, 17. Similarly, the energy of a reference signal 16 may be matched to operate properly with the particular frequency ranges chosen, and physical properties of the photonic transistor 14. Thus, various frequencies, energy levels and materials may be used for the apparatus of the filter 11. The common attribute is that the medium of the photonic transistor 14 in correspondence with the spectrum from which the signals 16, 17 are taken should be selected to provide a substantially linear medium for the interference process.

Referring to FIG. 2, while continuing to refer generally to FIGS. 1–13, the signal 18 as illustrated in the graphic D in the time domain 48, and in the graphic B in the frequency domain 46, provides an amplified data carrier 28, and a bias 31. In selected embodiments, the bias 31 may be effectively removed for compatibility with other devices in a system. To the end of removing a bias from the signal 18, a transistor 60 may receive a reference signal 16c in conjunction with the useful signal 18.

Relying on destructive interference between the signal 16c, 18, and more particularly the destructive interference between the amplified, modulated carrier 28 and the reference signal 16c the photonic transistor 60 strips the bias 31 from the signal 18, leaving the carrier 24 as illustrated in the graphic F. Meanwhile, much of the suppressed sideband signals 26 also pass through the photonic transistor 60 into the output 64.

In conventional thinking regarding photonic transistors in general, many have improperly assumed that both the sideband signals 22a, 22b and the carrier signal 24 were required to transmit the information embodied in the modulation thereof. However, as illustrated in the graphics A, C, the sidebands 22 correspond effectively to transient phenomena unnecessary to distinguish the differential between the carrier 24 and the off-state 30. As a direct result, the actual photonic bandwidth of the amplified carrier 28 of the signal 18 is substantially narrower than the effective bandwidth of the entire signal 17, including it's carrier signal 24 and associated sidebands 22a, 22b. Nevertheless, since the amplified carrier 28 contains all of the information modulated into the carrier 24, by the imposition of the data input 58 in the modulator 52, all of the needed information associated with the data input 58 remains in the amplified carrier signal 28. Therefore, the photonic bandwidth of the amplified carrier 28 becomes a hyper dense signal, when compared with the overall signal 17, including the carrier 24 and associated sidebands 22 that would be transmitted in a conventional system. Conventional techniques provide for transmission of sidebands 22a, 22b, or, in certain situations, transmission of either the sideband 22a, or the sideband 22b.

This latter technique has been referred to as single-sideband transmission. A hyper dense signal, such as the amplified carrier 28, lacking associated sidebands 26a, 26b in transmission has a narrower photonic bandwidth than either the conventional double or single sideband transmission techniques. Thus, a hyper dense signal 28 has a narrower photonic bandwidth than a single sideband signal carrying the same data from a data input 58.

Referring to FIG. 3, a hyper dense signal 18, 64 may be directed to a destination remote from a source apparatus 10 as described above. Accordingly, a signal 18, 64, comprising a hyper dense photonic signal embodying information originating from a data input 58, may be directed to a nonlinear device 50. Nonlinear device 50 may be optical, electro-optical, or otherwise appropriate to the frequency spectrum of the signal 16, 17. Nonlinear media have the property or characteristic that they can temporarily store energy. Accordingly, transient phenomena will cause generation of sideband frequencies. Consequently, occurrence of a transient phenomenon operating on the signal 18, 64 in the non-linear device 50 will regenerate sidebands.

Those sidebands will reflect the nature of the transient phenomenon. Accordingly, if the transient phenomenon corresponds to those occurring in the original signal 17, the original sidebands 22a, 22b may be regenerated by operation of a transient suitable for that regeneration. As a direct result, an original signal 17 within a sender 10 or a transmission device 10, is converted by the filter 11 to a hyper dense signal 64, which may be transmitted to a remote device or a receiver in a hyper dense format (photonic bandwidth) and reconstituted by operation of the nonlinear device 50 in the receiver.

FIG. 4 shows the interaction of two photonic signals 66, 68 during approximately three cycles, identified by the intervals 70, 72, 74. Each interval 70, 72, 74 corresponds to a single wavelength 76, 78 or cycles 76, 78. During the interval 70, all of the interaction between the two signals 66, 68 occurs. This occurs due to superpositioning of the signals 66, 68 or waves 66, 68 during the interval 70. By contrast, during the interval 74, superposition has yet to occur between the signals 66, 68. Therefore, no interference takes place.

During the interval 72, by contrast, interference has already occurred previously. Therefore, the energy originally contained in the signals 66, 68 during time 72 has been redistributed between the output signals 80, 82. In conventional teachings regarding signal processing in general, a teaching persists that in all media, frequencies, and signals, a carrier remains on at all times whether or not modulated information is being transmitted.

Conventional wisdom is that a carrier does not itself contain any information. Instead, the information carrying capacity is credited to the sidebands associated with the carrier. For that condition to occur in reality, energy from the carrier during on-times must be stored in some operative storage mechanisms during times when the carrier is on, to be released during those times during which the carrier is off.

In electronic devices, or devices relying on electronic phenomena, the presence of nonlinearities, capacitance, inductance, and so forth perform the energy storage function. Such phenomena are commonly displayed on a conventional spectrum analyzer. The operation of such equipment (e.g. spectrum analyzers, and the like) will tend to mask the true nature of the physics occurring in the photonic domain.

The illustration of FIG. 4 illustrates why the interference phenomenon operating in the photonic environment of photonic transistors lacks a mechanism for storage of energy. From one cycle or interval 70, 72, 74 to the next. Photonics is a quantum phenomenon. Accordingly, all of the energy contained in a single cycle 76, 78 (corresponding to a interval 70, 72, 74) resonates as a complete quantum unit. Thus, the finest resolution available for providing a differential embodying information modulated into a photonic signal, is limited by the wavelength 76, 78 that is, an interaction cannot occur in less than the interval 70, 72, 74 corresponding to a single wavelength 76, 78.

The single cycle or interval 70 of any interference phenomenon or of any corresponding photonic signal 66, 68 is the limit of the time in which energy can be stored during the phenomenon. Therefore, linear photonic phenomena lack any device capable of storing energy during an on-state of a carrier for later release or distribution during an off-state extending longer than a single cycle interval 70. The propagation of photonic signals includes a continual process of interference. In the absence of an energy storing medium, on-off keyed signals as well as others embody information of one kind or another in all of the photons of different frequencies. Those that carry redundant information or transient information can be photonically removed leaving only one photonic signal at one frequency to carry the needed information to the receiver.

Referring to FIG. 5, a simplified alternative embodiment provides for creation of a hyper dense signal. In the embodiment of FIG. 5, a signal 18 may impinge on a spatially dispersive device 84. For example, the device 84 may be a grating 84, a prism, or any physical device that may provide spatial dispersion of the original signal 18 according to frequency. As a result, the signal 18 may be thought of as being distributed among several frequencies, one of which may be identified as a carrier 24, while other frequencies will be characterized as the sidebands 22a, 22b, resulting from the dispersion. Providing a mask 86 having an aperture 88 located to admit the carrier 24, provides a filter 86. Accordingly, the carrier 24 alone passes through the aperture 88, as the signal 64. Thus, the signal 64 is a hyper dense signal, which may be used in any manner suitable for a photonic signal. In certain embodiments, the signal 64 may impinge on a detector 90. If the detector 90 is a non-linear device, then transient phenomena involving the carrier 64 impinging on the detector 90 will produce the ringing or transient signals that characterize the sidebands 22. Accordingly, the detector 90 can output a reconstituted signal 17. The signal 17 may be output to be displayed on a spectrum analyzer 92. Accordingly, the spectrum analyzer 92 or the display 92 will display the carrier 24, along with the reconstituted sidebands 22a, 22b from the detector 90.

Figure 6:
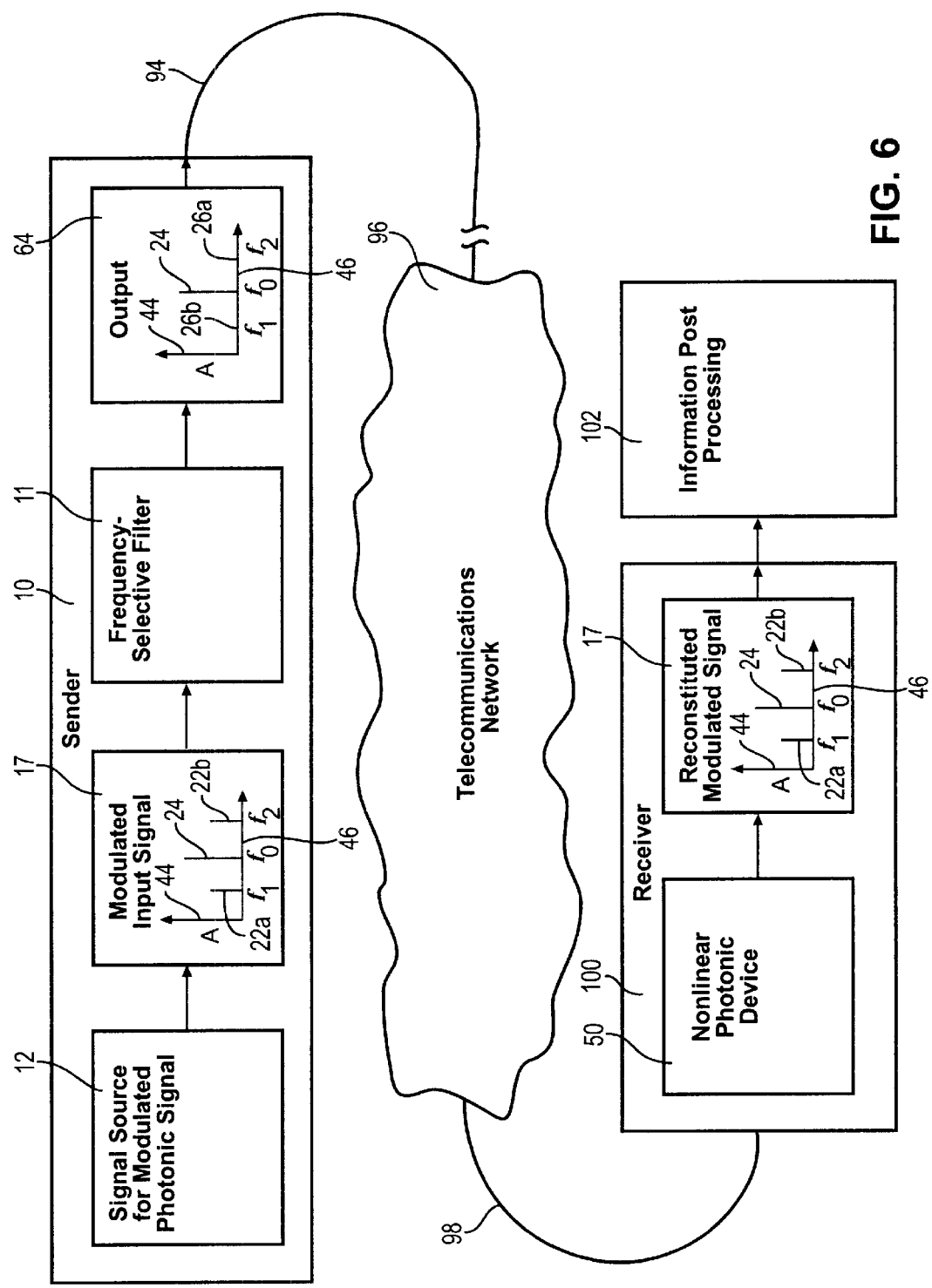
FIG. 6 is a schematic block diagram of a hyper dense transmission system in accordance with the invention.

Referring to FIG. 6, a hyper dense transmission system includes a sender 10. In general, a source 12 may be a signal source for providing a modulated photonic signal 17. The signal 17 may be characterized by the carrier 24 and sidebands 22 as described above. The signal 17 may be received by a filter 11 as described in conjunction with FIGS. 1–3. The resulting output 64 is a hyper dense output having a carrier 24 and suppressed sidebands 26a, 26b. The hyper dense signal 64 launched into a carrier medium 94 may enter a network 96 for transmission to a remote location served by a carrier medium 98. In general, a receiver 100 may comprise a non-linear photonic device 50 for reconstituting the signal 17. The signal 17, therefore contains a carrier 24 and the associated sidebands 22a, 22b if desired. The post-process 102 for receiving the reconstituted signal 17 may be any particular operation having use for the information transmitted by the signal 17, and transmitted between the sender 10 and receiver 100 by the hyper dense signal 64.

Figure 7:
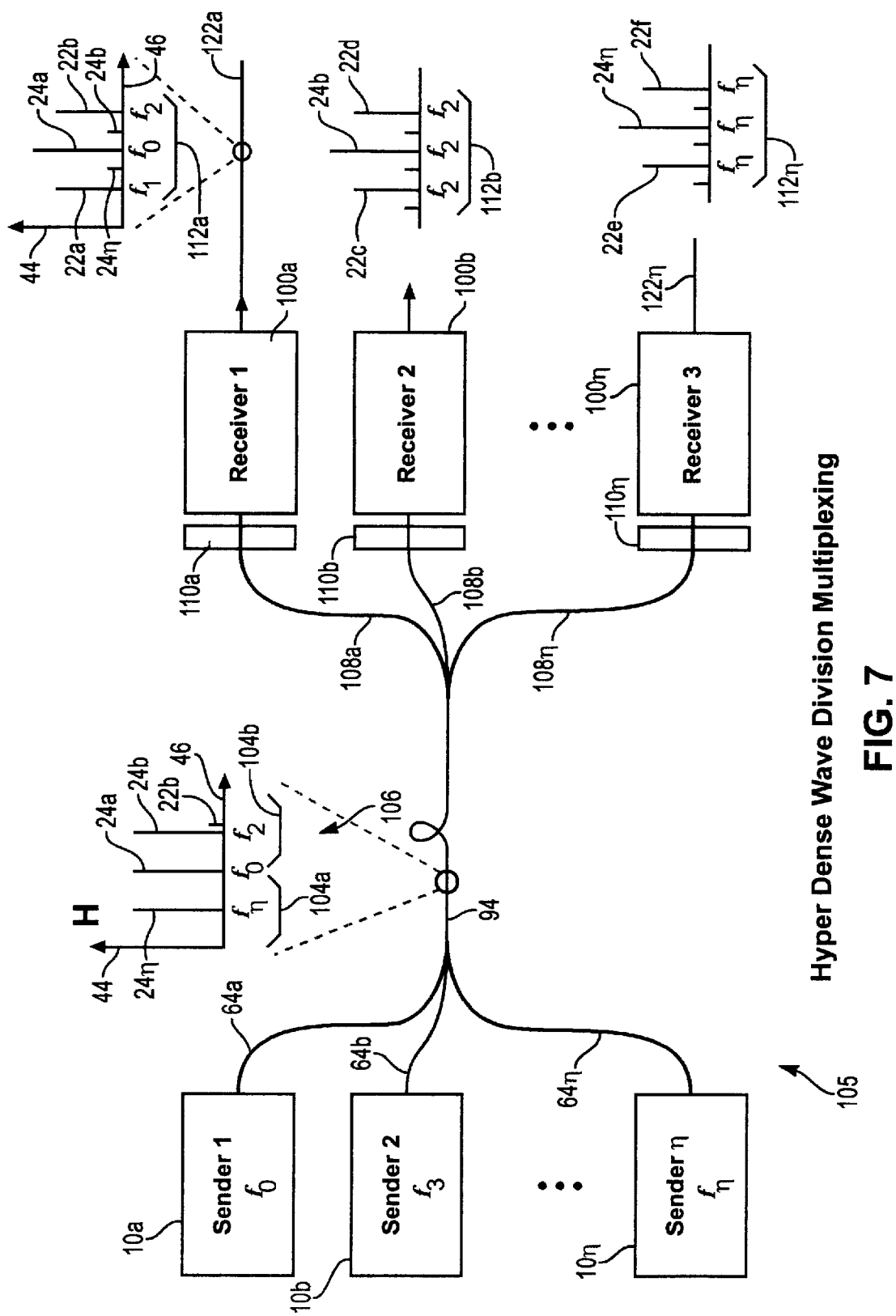
FIG. 7 is a schematic block diagram of illustrating multiple senders transmitting a hyper dense, wave-division multiplexed signal in accordance with the invention.

Referring to FIG. 7, the recovered bandwidth 104 available for use in a hyper dense, wave-division multiplexing system 105 is illustrated. In the embodiment of FIG. 7, multiple senders 10 (e.g, 10a, 10b, 10n) transmit a hyper dense, wave-division-multiplexed signal 106.

The hyper dense signal 64 depicted in the time domain 48 in the graphic G (see FIG. 2) includes a carrier 24 and associated suppressed sidebands 26 due to the suppression of the sidebands 26a, 26b, the frequency spectrum 104a, 104b or the bandwidth 104a, 104b from the spectrum that would have been necessarily occupied by transmission of the sidebands 26a, 26b in a conventional system lack sufficient signal energy to interfere with another signal. Thus, the bandwidth 104a, 104b is actually recovered bandwidth 104 for placing other carriers 24 therein. The sidebands 26a, 26b may be thought of as being sufficiently suppressed that they are part of the noise level, and no further filtering is required to eliminate their influence on the transmission of other signals. Not only is the resulting carrier 24 hyper dense in terms of the photonic bandwidth thereof required for transmitting it's contained data 58, but the carrier 24 and other carriers 24 corresponding to other signals may now be placed within the spectrum space 104a, 104b in a hyper dense packing arrangement.

Figure 8:
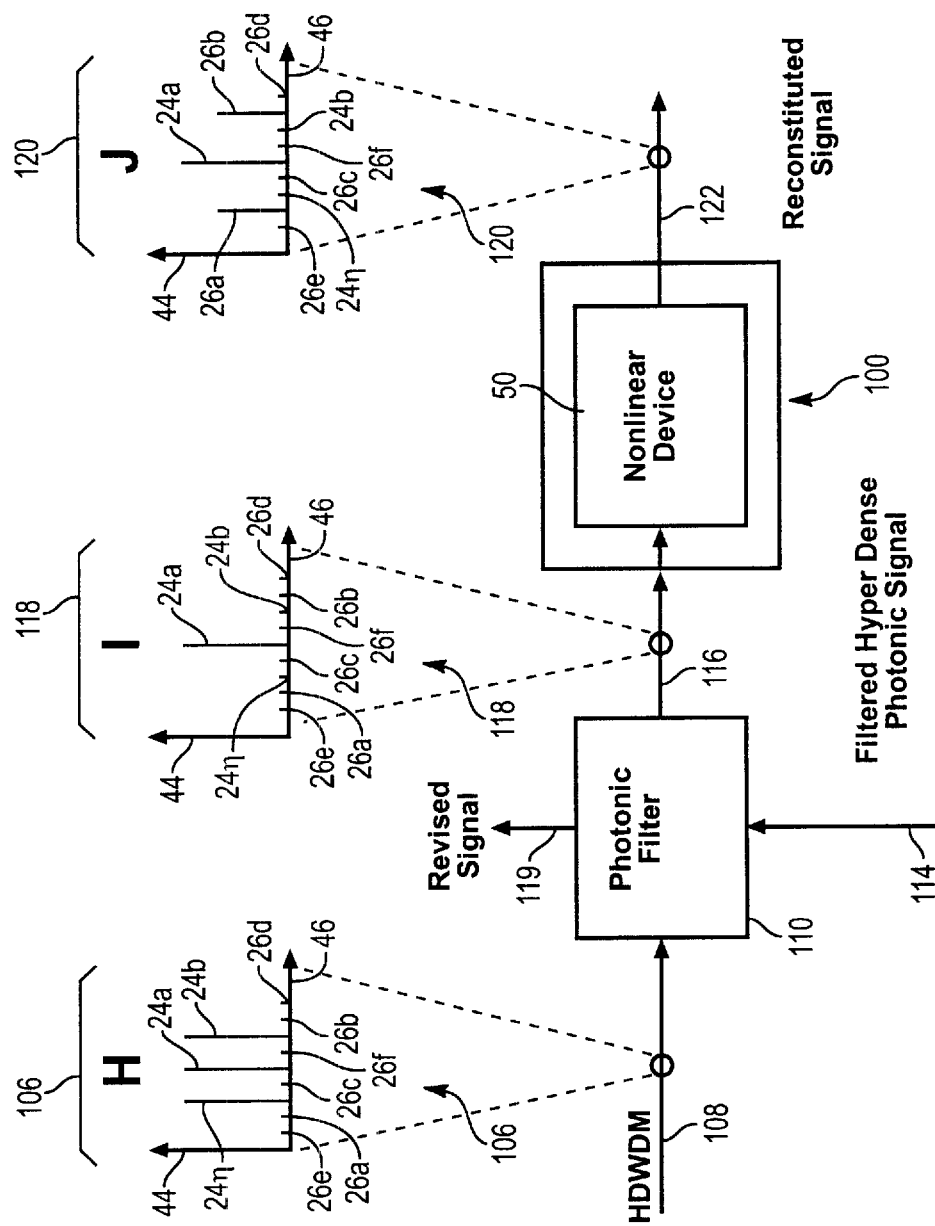
FIG. 8 is a schematic block diagram illustrating signals and components corresponding to each single channel of one embodiment in accordance with the invention.

Referring to FIGS. 7–8, several senders 10 (e.g. 10a, 10b, 10n) may be multiplexed together by combining the output signal 64a, 64b, 64n corresponding thereto into a carrier medium 94. The hyper dense, wave-division multiplexed signal 106 carried by the transmission medium 94 is depicted graphically in graphic H. Several carriers 24a, 24b, 24n are spaced at unique frequencies, but the individual frequencies of the carriers 24 are more closely spaced than they would have been had they not been hyper dense, wave-division multiplexed signals 106. For example, the sender 10a produces the carrier 24a and the associated suppressed sidebands 22a, 22b. Similarly, the sender 10b produces the carrier 24b and associated suppressed sidebands 22c and 22d. Likewise, the sender 10n produces the carrier 24n and the associated sidebands 22e, 22f.

All of the suppressed sidebands of 26 are in the noise level or below the noise level with respect to the carriers 24. The combination of the various carriers 24a, 24b, 24n, constitutes a hyper dense, wave-division multiplexed signal 106 carried by the carrier medium 94. At a remote location or destination, the line carrier medium 94 may be subdivided into individual lines 108 (e.g. 108a, 108b, 108n) servicing different receivers 100a, 100b, 100n, respectively. In one presently preferred embodiment each of the lines 108 passes the hyper dense, wave-division multiplexed signal 106 to one of the filters 110 corresponding to the receivers 100. For example, the filters 110a, 110b, 110n service the receivers 100a, 100b, 100n, respectively. Each of the filters 110 photonically selects one of the hyper dense carriers 24 destined for that filter's associated receiver 100.

Referring to FIG. 8, while continuing to refer to FIG. 7, and more generally to FIGS. 1–13, the signals and components corresponding to each single channel is illustrated. Near the receiver 100, a hyper dense, wave-division multiplexed signal 106 may be received on an input line 108 into a photonic filter 110. A narrowband reference signal 114 into the photonic filter 110 is frequency and phase matched with one of the carriers 24 in the signal 106. Accordingly, the filter will pass over the line 116 a signal 118 to the receiver 100.

The residual energy, not included in the transmitted signal 118 passes out the residual path 119. In the example, the signal 118 is characterized by the carrier 24a. However, each signal 118 will correspond to a separate carrier 24 from the hyper dense, wave-division multiplexed signal 106. The carrier 24a in the signal 118 corresponds to the frequency selected by (and corresponding to) the narrowband reference signal 114. Meanwhile, the photonic filter 110 has suppressed all of the other signals (both carriers and sidebands) from the signal 106. For example, the carriers 24b, 24n as well as the sidebands 26 are suppressed. Relying on the non-linear device 50, the receiver 100 provides a signal 120 over the output line 122. As described above, the operation of the non-linear device 50 in transient conditions relies on the carrier 24a to reconstitute sidebands 26a, 26b as illustrated in the graphic J. The specific wave form associated with the carrier 24a is responsible for the wave forms that result from the transient phenomena in the non-linear device 50, resulting in the characteristic sidebands 26a, 26b, as reconstituted. Accordingly, the reconstituted sidebands 26a, 26b accurately reflect the original sidebands 26a, 26b in the input signal 17. Nevertheless, because the remaining sidebands 26 in the signal 120 are not associated with the wave form of the carrier 24a, they remain suppressed. That is, since the frequency and wave form required to regenerate them is not present and does not pass through the same transient phenomena in the non-linear device 50, the suppressed sidebands 26 remain suppressed.

Each of the photonic filters 110 corresponding to a particular channel operates with a distinct frequency corresponding to that filter's distinct narrowband reference 114. Accordingly, each channel with it's dedicated photonic filter 110 and receiver 100 reconstitutes it's own signal 120 corresponding to the unique frequency and wave form of its carrier 24. Accordingly, each unique set of a carrier 24 and associated sidebands 22 is reconstituted by the receiver 100.

Figure 9:
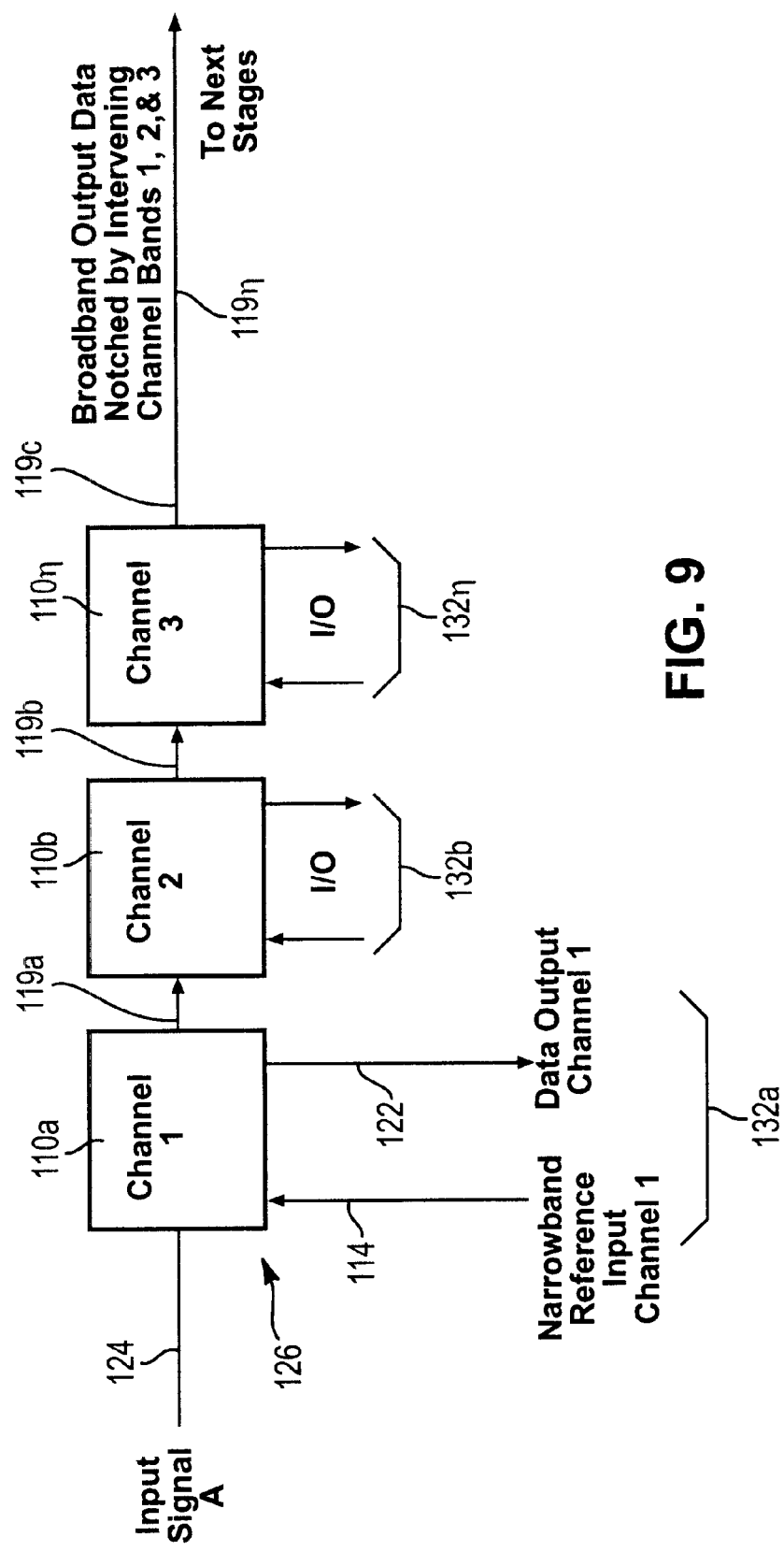
FIG. 9 is a schematic block diagram illustrating an embodiment in which the receivers are arranged in a series arrangement in accordance with the invention.

Referring to FIG. 9, while continuing to refer generally to FIGS. 1–13, the receivers 100 may be arranged in a series arrangement rather than in parallel. In the embodiment of FIG. 9, an input signal 124 may be either a broadband signal from a conventional device, or a photonic hyper dense, wave-division multiplexed signal in accordance with the invention. Accordingly, the signal 124 is received by a filter 110a, which may be a drop filter 126. That is, in general, a filter 110 having the proper characteristic to handle the signal 124. On the other hand, a drop filter 126 is a suitable mechanism or embodiment of a filter 110 for handling photonic signals.

In the embodiment of FIG. 9, the residual 119a from the filter 110a, and more generally, each of the residual signals 119 results from a filter 110 and then passes to another filter 110 to provide a new I/O 132. Each I/O 132 comprises an output 122 in accordance with the selected frequency and wave form of a reference signal 124 as described with respect to FIG. 8. Since each of the residual signals 119 or residual lines 119 contain the information of the input signal 124, as well as substantially all of the energy not diverted by the filter 110 preceding the residual 119, more energy is conserved in the serial arrangement of FIG. 9, as opposed to the energy division of FIG. 7.

Figure 10:
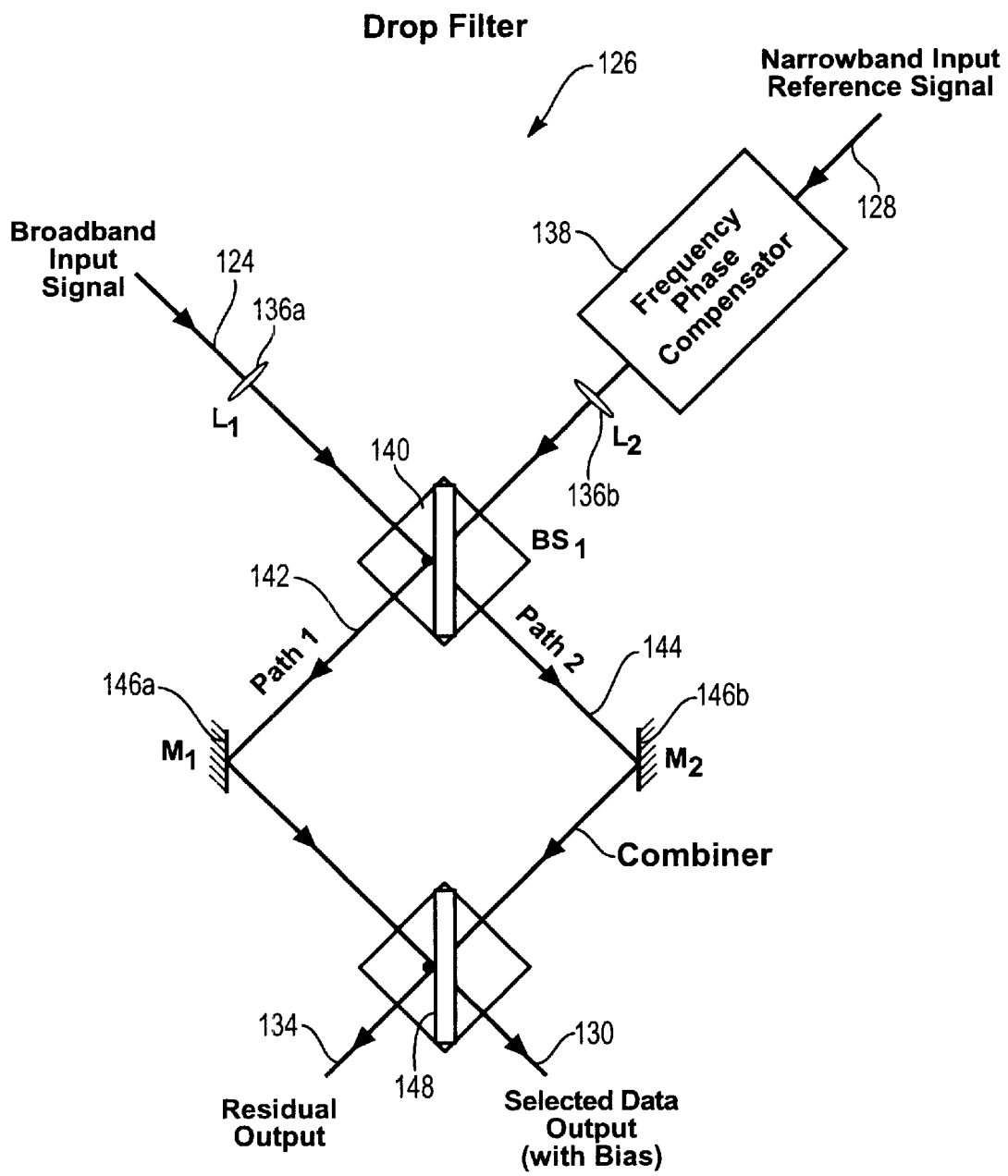
FIG. 10 is a schematic block diagram illustrating one embodiment of a drop filter receiving a photonic, broadband, input signal and a reference signal or narrowband input reference signal in accordance with the invention.

Referring to FIG. 10, while continuing to refer generally to FIGS. 1–3, one embodiment of a drop filter 126 may receive a photonic, broadband, input signal 124 and a reference signal 128 or narrowband input reference signal 128. In general, the collimating lenses 136 are optional. If phase and frequency adjustment or compensation are desired, in the signal 128, then an optional phase and frequency compensator 138 may be incorporated to process the signal 128. Each of the signals 124, 128 is directed into a beam splitter 140 providing outputs 142, 144. The beam splitter 140 may be an amplitude splitter, such as a partially silvered mirror, a holographic beam splitter or the like.

The signals 142, 144 may be directed by mirrors 146 into a combiner 148. For example, a photonic transistor 148 makes a suitable combiner 148 for this application. Interference in the combiner 148 provides selection of a particular selected output 130 in one direction, and the residual signal 134 in another direction. If the distances traveled by each of the signals 142, 144 between the beam splitter 140 and the combiner 148 are substantially equal, then substantially all of the energy from the signal 124 will arrive at the residual signal 134, while the energy from the signal 128 will substantially all appear in the signal 130. That is, because interference is a linear phenomenon, the constructive interference condition correspondence is maintained between the constructive interference condition resulting in associating the energy from the signal 124 with the residual 134, and the energy of the signal 128 with the signal 130. The opposite path for each signal 134, 130 out of the combiner 148 provides a destructive interference portion of each signal 124, 128.

The reflectivity of the beam splitter 140 and combiner 148 may be balanced or unbalanced. If the reflectivities of both devices 140, 148 are equal or are complementary, and therefore balanced, the redirection of energy from the signal 128 to the signal 130 is nearly total. Similarly, the redirection of energy from the signal 124 to the signal 134 is nearly total. In accordance with the invention, an unbalanced state is produced by selection of devices 140, 148 having reflectivities that are different and unbalanced. Therefore, interference between a signal 128 (this reference 128) at a particular frequency, and a carrier corresponding to that frequency, and embodied in the input signal 124 occurs at the beam splitter 140, which acts as a combiner 140 in that circumstance.

The redistribution of energy caused by interference may be directed into the signal 142, the signal 144, or both. The energy distribution will be unbalanced compared to the division of energy by the splitter 140 for any other frequencies in the signal 124, and not corresponding to the frequency of the reference signal 128. Because of the unbalance or the disproportionate distribution of energy from the carrier 24 of the signal 124 corresponding to the frequency of the reference signal 128, the disproportionate distribution of energy differs from the distribution of energy from the other frequencies of the signal 124. As a result of this phenomenon, the signal 130 will receive energy from the reference signal 128, and from the carrier of interest from the signal 124.

Accordingly, the data imposed by modulation of the carrier 24 is transferred to the output 130 and is detectable as the change in the signal 130, since the reference signal 128 is a continuous wave, typically. Thus, the drop filter 126 directs the information in the selected carrier 24 of the signal 124 to the signal 130. Meanwhile, the residual signal 134 contains the information contained in other carriers 24 in the signal 124. The drop filter 126 is therefore a dynamic filter 126 capable of programmatic or other control of the signal selected to be output in the signal 130 by selecting the frequency of the reference signal 128. Meanwhile, other drop filters 126 may process the residual 134 to retrieve other carriers 124 contained in the input signal 124 and corresponding to other frequencies of other reference signals 128.

Thus, a bank or array of drop filters 126 constitutes a dynamic wave-division demultiplexer. Moreover, using a bank of drop filters 126 in accordance with the invention, the incoming signal 124 may be a hyper dense, wave-division multiplexed signal. Thus, the bank of drop filters 126 provides a dynamically controlled hyper dense, wave-division demultiplexer.

Figure 11:
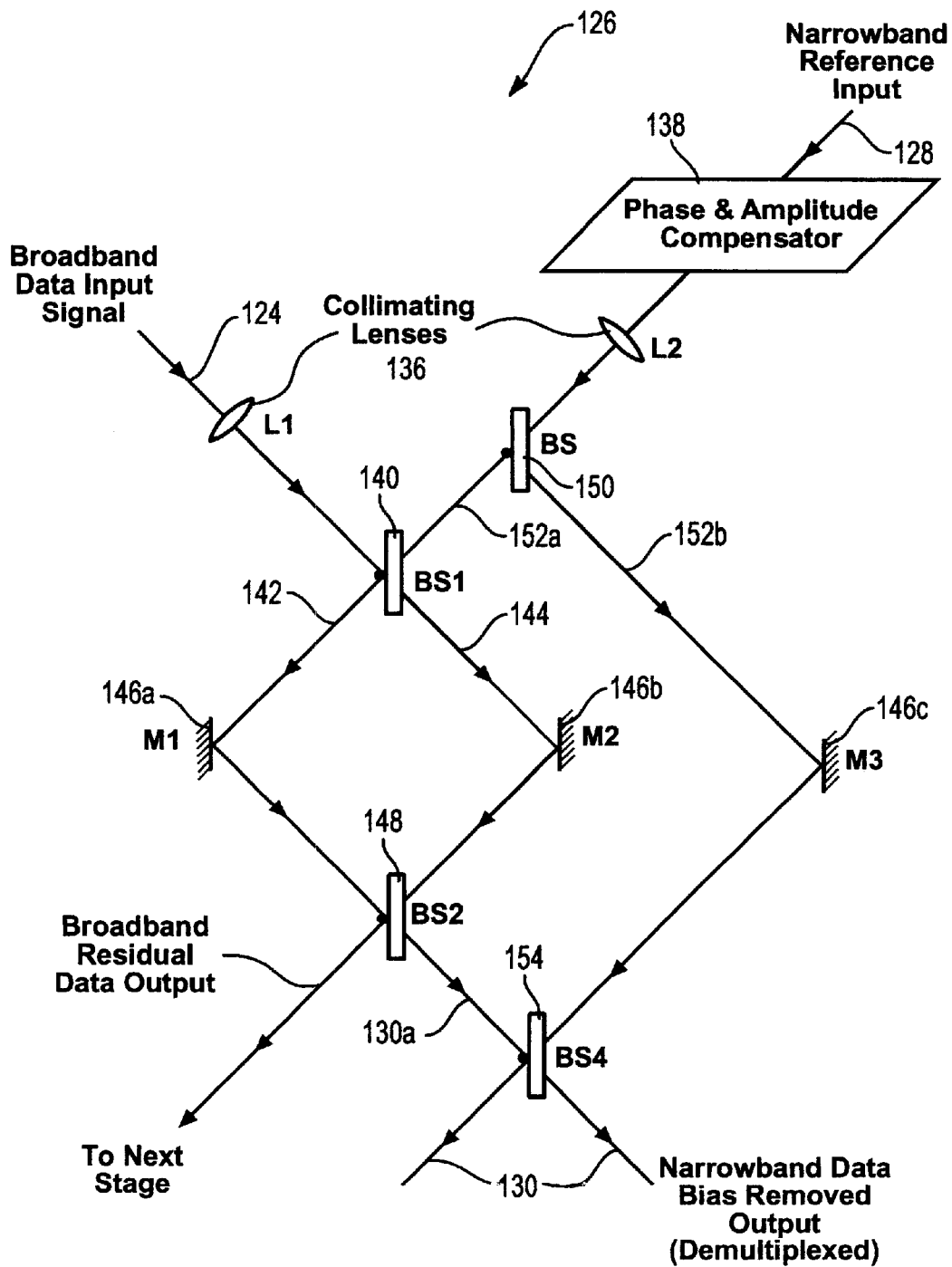
FIG. 11 is a schematic illustration of an alternative embodiment of the drop filter of FIG. 10 having the additional capacity to remove a biased signal in accordance with the invention.

Referring to FIG. 11, an alternative embodiment to a drop filter 126 may include all of the structural elements of the drop filter 126 illustrated in FIG. 10, with additional capacity to remove a biased signal that may exist in a signal 130. A beam splitter 150 redirects a portion of the energy from the signal 128 to each of the signals 152a, 152b. The signal 152 may be redirected by a mirror 146c to a photonic transistor 154, such as a beam splitter 154 set up to provide the interference inherent in photonic transistors 154. The output 130a from the photonic transistor 148, containing a bias signal, interacts with the signal 152b in an interference relationship at the photonic transistor 154. As a result, the signal 130 contains the data from the signal 130a, and from the selected portion of the signal 124 embodied in a desired carrier 24, without including the bias that resulted from the energy of the reference signal 128.

The ability or efficiency of the drop filter 126 to separate out a desired signal (e.g. carrier 24) from a signal 124 and to output the information and energy of that signal in the output signal 130 may be controlled by selection of the physical characteristics of the various components 140, 148, 150, 154, along with the amplitudes (e.g. energy levels) of the various signals involved. For example, some of the physical parameters that may be adjusted in selecting and designing components may include reflectivities, precision in matching pathlengths traversed by the signals 142 and 144.

Figure 12:
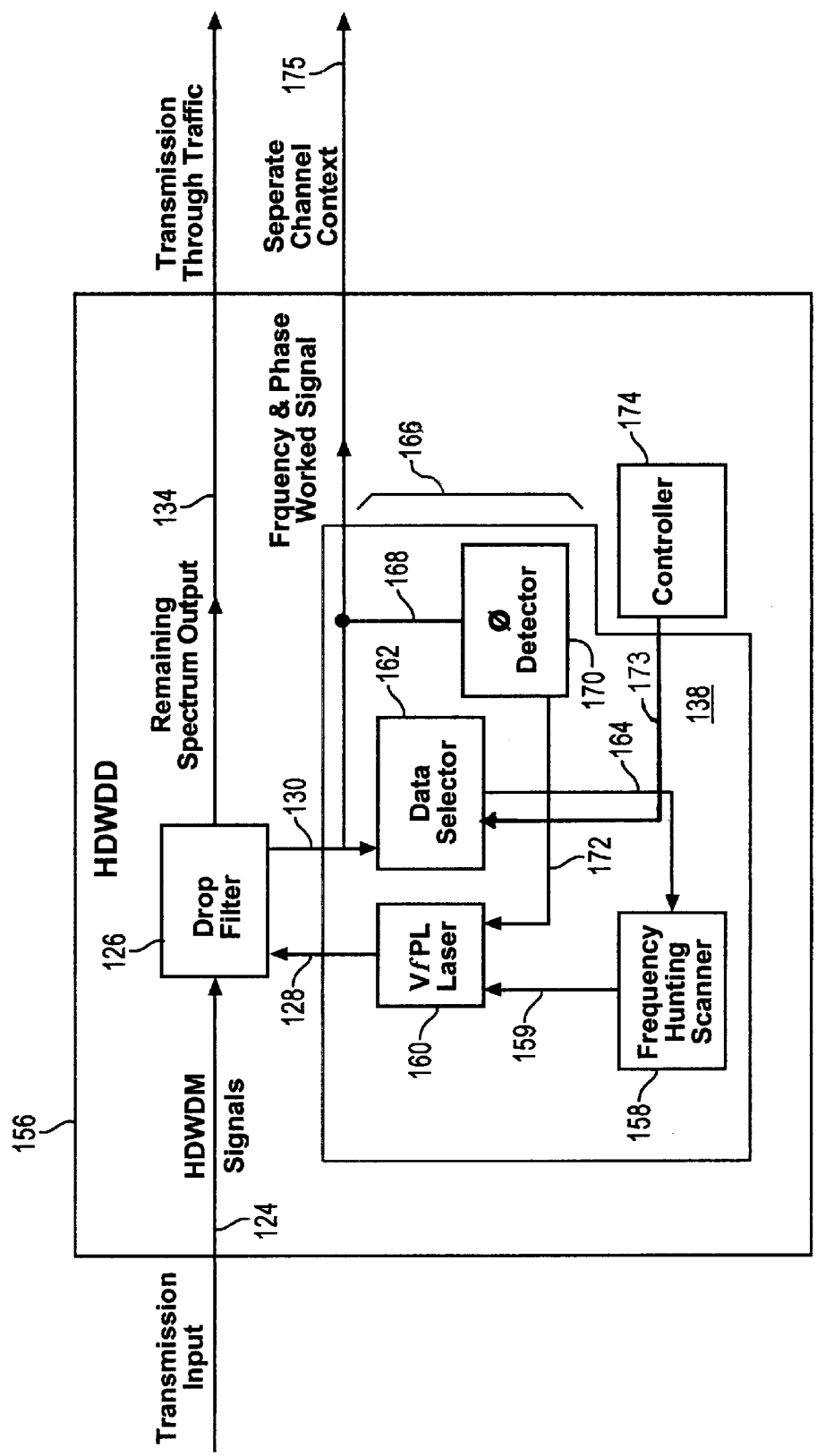
FIG. 12 is a schematic block diagram illustrating separation of a hyper dense channel in accordance with the invention.

Referring to FIG. 12, a hyper dense channel separator 156 is illustrated. Because carriers 24 or channels 24 may be configured in hyper dense arrangement as discussed above, increased demands for precision are placed on the reference signal 128. Accordingly, an apparatus and method for identifying and selecting a correct channel is a valuable improvement in the operation of drop filter 126. In one embodiment, a scanner 158 provides a control signal 159 for controlling frequency in a variable phase and frequency reference source 160.

The reference source 160 provides a reference signal 128 to the drop filter 126. The reference signal 128 is relied upon by the drop filter 126 as described above. Similarly, the drop filter 126 provides the output 130 as described previously herein. A portion of the signal 130 is directed to a data selector 162. The data selector provides an output 164, which becomes an input 164 for the scanner 158. Thus, the scanner 158, reference 160, drop filter 126, and data selector 162, with their connecting lines and signals constitute a frequency-locked loop 138. Following locking onto a frequency by the frequency-locked loop 138, a phased-locked loop 166 locks onto a particular phase for the reference signal 128. Thus, the frequency-locked loop 138, and the phased-locked loop 166, thus assure the integrity of the data in the signal 130. The phase-locked loop 166 receives a portion of the signal 130 through a line 168 to a phase detector 170.

The phase detector 170 provides a controlled signal 172 as an output that serves as an input to the variable frequency and phase reference 160. Together, the phase controlled signal 172 and the frequency control signal 159 operate to direct the operation of the variable frequency in phase reference 160 in phase locking the reference signal 128 with a carrier from the hyper dense, wave-division multiplex signal 124 entering the drop filter 126.

The data selector 162 is configured to be able to identify a desired channel in the hyper dense, wave-division multiplexed signal 124. The data selector 162 receives a controlled signal 173 from a controller 174. The controller 174 establishes the information that will identify a particular, desired channel. Accordingly, the data selector 162 operates by any suitable method to identify a characteristic by which the desired channel may be identified and selected by the drop filter 126. Thus, the data selector 162 provides two important functions.

Initially, the data selector 162 detects a signal passing through the drop filter 126 as a signal, rather than noise. Thereafter, following operation of the phase-locked loop 166 and the frequency-locked loop 138, the data selector 162 then uses the information from the signal 173 of the controller 174 to determine whether the signal, now identified as containing data rather than noise, is a signal corresponding to the desired channel. If the signal does not correspond to a desired (selected) channel, then the data selector 162 authorizes the scanner 158 to continue it's process of scanning for signals. On the other hand, if the signal 130 is established as pertaining to the desired channel, then the frequency-locked 138, and phase-locked loop 166 remain locked, directing a portion of the signal 130 to an output line 175 to be used as a separated channel providing a demultiplexed output, which may be used for its content.

Figure 13:
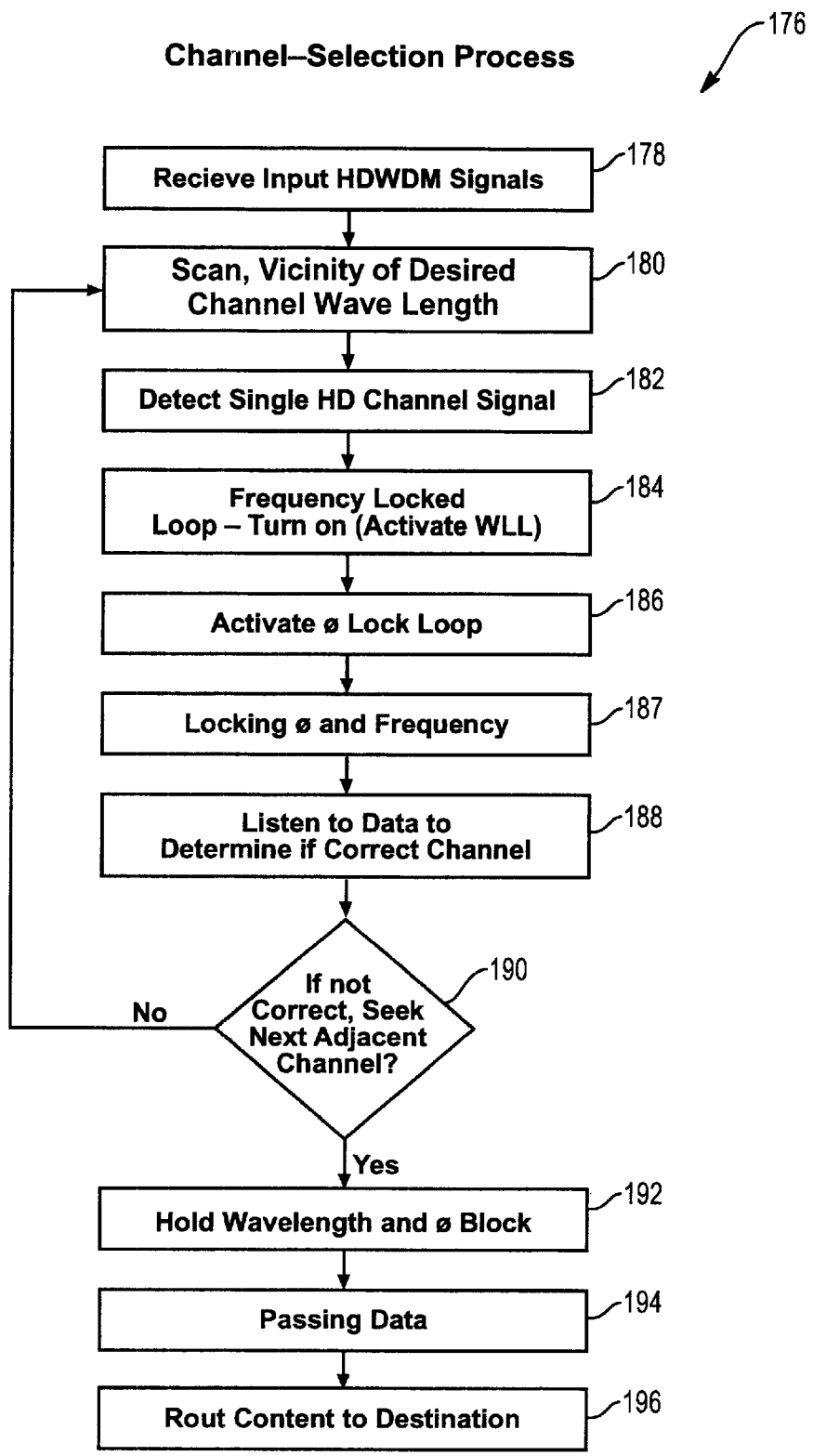
FIG. 13 is a schematic block diagram illustrating one embodiment of a process of operation of a hyper dense, wave-division multiplexer in accordance with the invention.

Referring to FIG. 13, the process of operation of a hyper dense, wave-division multiplexer in accordance with the invention, may be characterized as a process 176. In one embodiment, the channel-selection process 176 may include receipt 178 of an input. The input 124 is a hyper dense, wave-division multiplexed signal. Next, scanning 180 in the range of frequencies close to desired channels or expected frequencies is conducted by a scanner 158. Eventually, detecting 182 of a single channel results from the continuous scanning 180 of signals in sequence, and evaluation thereof by the data selector 162. Eventually, a locking 184 of the is frequency-locked loop ceases the scanning 180. Thereupon, activating 186 the phase-locked loop results in all further variation of phase frequency by the reference source 160. Thus, locking 187 of both phase and frequency enables the phase and frequency compensator 138 to begin to commence comparing 188 the content of the signal 130 to a channel identification provided by the signal 173 from the controller 174.

A test 190 determines whether the data on which the loops 165, 166 are locked is the desired channel may advance the process 176 to holding 192 if the test results in an affirmative answer, the signal is the desired one. Otherwise, a negative response to the test 190 returns the process 176 to scanning 180 again. Following holding 192 of the frequency and phase, passing 194 data in the signal 130 to an output line 175 provides the necessary information or channel information for the requisite time to complete transfer 194 (passing 194) of all desired data. Subsequently, the signal 130 on the line 175 is then routed 196 to the destination device. Because the apparatus 156 is a dynamically controllable hyper dense, wave-division demultiplexer, it can be effectively operated as a dynamically-controlled data-routing system 156. Accordingly, an apparatus and method in accordance with the invention may be operated as a dynamically comprovisioned router.

The controller 174 may be provided with virtually any type of information in order to effect control over the apparatus 156. Accordingly, digital data, analog data, addressing information, including information imbedded in data content itself may be used to dynamically route or provision with the apparatus 156.

Figure 14:
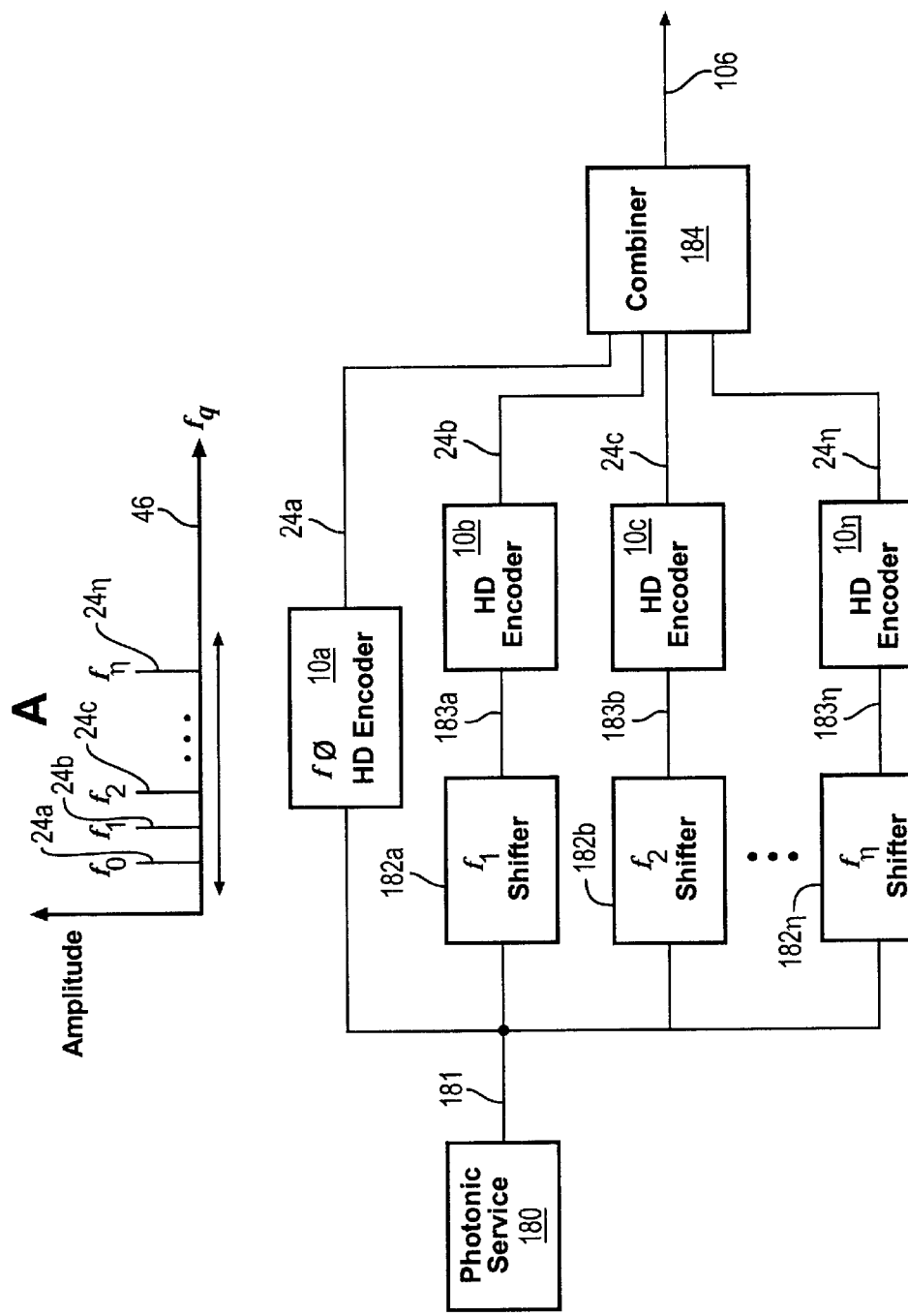
FIG. 14 is a schematic block diagram of a hyper dense wave-division multiplexer in accordance with the invention.

Referring to FIGS. 14 through 17 while continuing to refer to FIGS. 1 through 17, FIG. 14 depicts a hyper dense wave-division multiplexer. The embodiment of FIG. 14 employs a single photonic source 180 to produce energy. The embodiment of FIG. 14 shifts the frequencies of the energy to positions where carriers may be inserted into a hyper dense wave-division spectrum. A portion of the energy from 180 may be shifted to each of the different frequencies F1, F2 through Fn. The hyper dense wave-division spectrum is depicted in FIG. 14 at graphic A. Frequency axis 46 displays the frequency domain and amplitude 44 illustrates the corresponding amplitude. The hyper dense wave-division multiplexer produces the spectrum shown in graphic A, which will become output 106 of the multiplexer.

The photonic source 180 provides photonic energy signal 181, which is distributed to various compontents in the multiplexer. Initially, signal 181 has a frequency that corresponds with F0 in graphic A. Hyper dense encoder 10a receives signal 181 and then encodes and modulates signal 181 with hyper dense information. After processing, hyper dense encoder 10a outputs signal 181 as modulated carrier 24a, also labeled as F0 in graphic A.

Signal 181 may also be distributed to shifters 182a, 182b through 182n. As illustrated, any arbitrary number of shifters 182 may be used. The shifter 182a shifts the frequency of signal 181 to produce an output 183a having a frequency f1, as shown on graphic A. In the depicted embodiment, signal 183a is encoded with hyper dense information at hyper dense encoder 10b, thus, producing output modulated carrier 24b. Likewise, in the depicted embodiment, signal 181 is distributed to shifters 182b through 182n, each of which produces an output CW signals 183b through 183n. The output signals 183b through 183n are each encoded with hyper dense encoders 10c through 10n to produce modulated carriers 24c through 24n.

In the depicted embodiment, the hyper dense modulated carriers 24a through 24n are then combined in a photonic combiner 184 to produce the multiplex output 106 having the spectrum shown in graphic A, which is a hyper dense spectrum made of up hyper dense signals as described previously.

Figure 15:
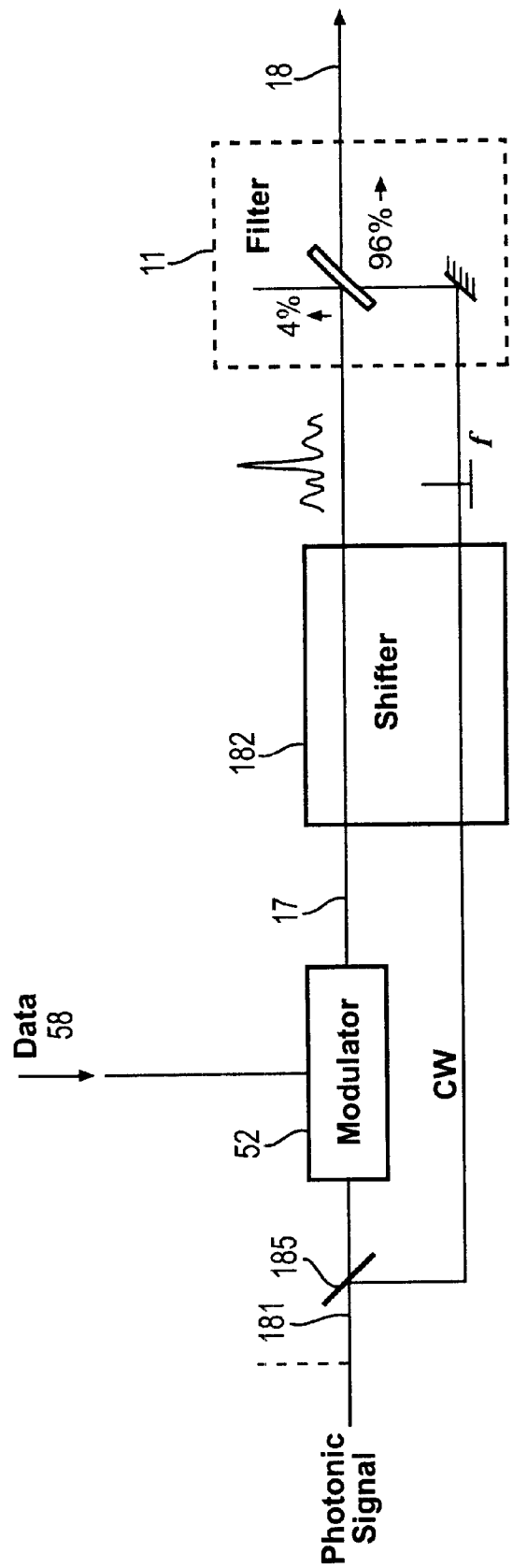
FIG. 15 is a schematic block diagram of a hyper dense frequency shifter and encoder combined in accordance with the invention.

Referring to FIG. 15 while continuing to refer generally to FIGS. 1 through 17, FIG. 15 is a hyper dense frequency shifter and encoder combined and is an alternative embodiment to the specific arrangement described in FIG. 14. In the embodiment of FIG. 14, the input signal 181 is shifted to become CW signal 183, which is then encoded by encoder 10 to produce outputs 24. The output 24 may also be produced in the embodiment shown in FIG. 15 where an input signal 181 is split by splitter 185, a portion of which is modulated by modulator 52 using data 58 to produce signal 17, as is described previously.

In the embodiment of FIG. 15, signal 17, along with a CW signal 181, are then shifted simultaneously by directing both beams through a signal shifter 182 such that signal 17 and CW signal 185 are shifted exactly the same amount. As shown, signal 17 and CW signal 181 may then be directed into filter 11, which can take on any of the filter embodiments previously described. Filter 11 produces an output 18. Of course, modulated carrier 24 resides on output 18. The embodiment shown in FIG. 15 may be used in lieu of the shifter encoder arrangement embodiment shown in FIG. 14.

Figure 16:
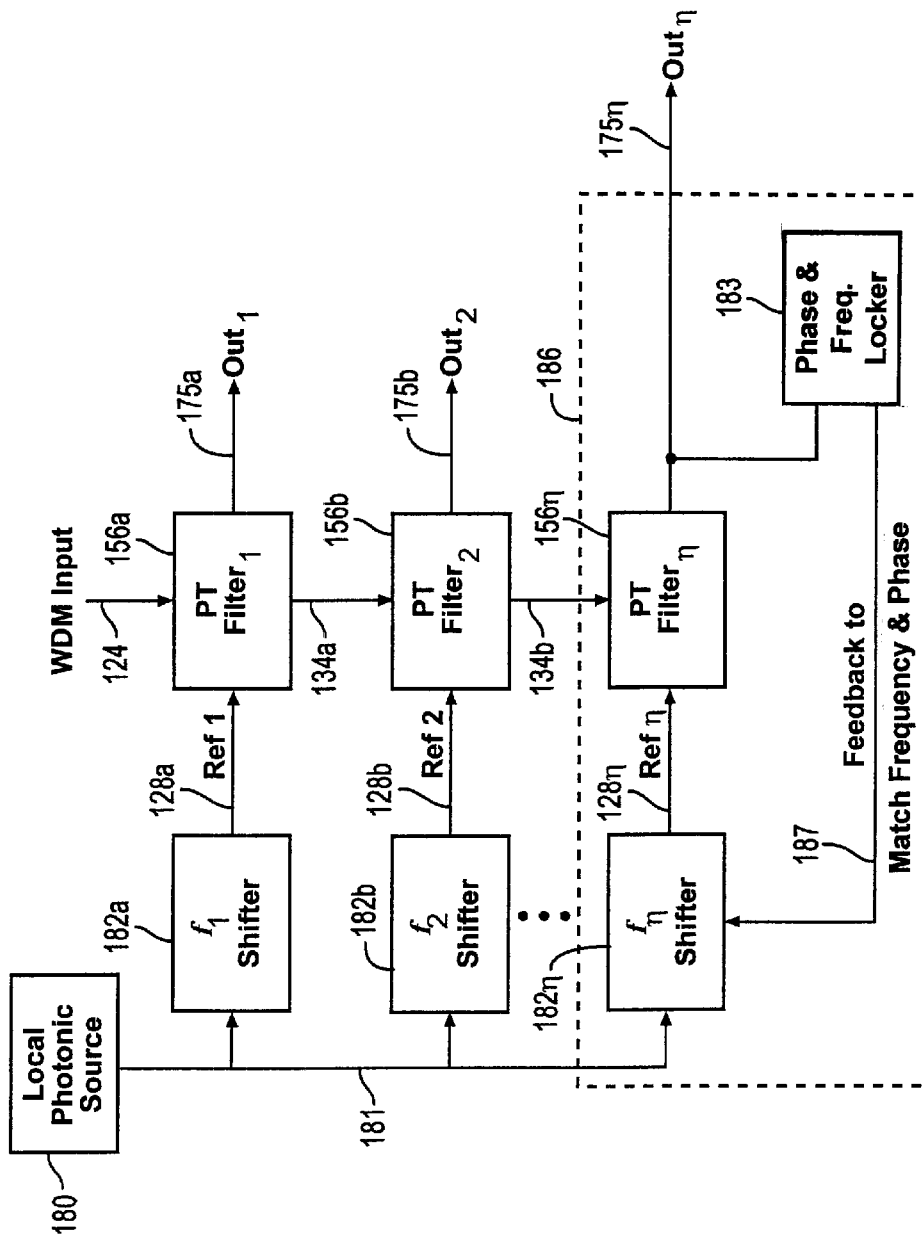
FIG. 16 is a schematic block diagram of a demultiplexer that can be used with hyper dense wave-division multiplexed signals in accordance with the present invention.
Figure 17:
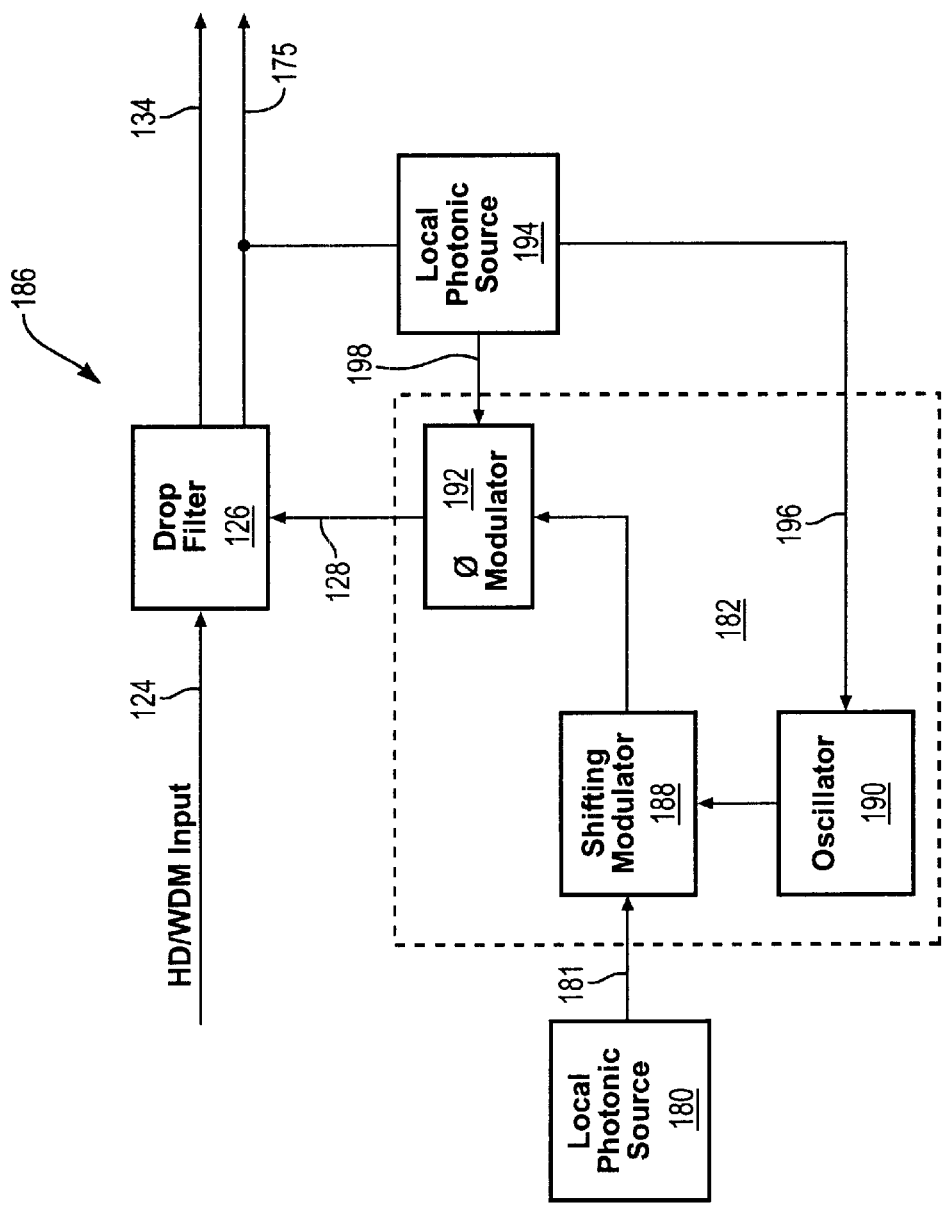
FIG. 17 is a schematic block diagram of a channel separation assembly in accordance with the present invention.

Referring to FIGS. 16 and 17, while continuing to refer to FIGS. 1 through 17 generally, FIG. 16 shows a demultiplexer that may be used with hyper dense wave-division multiplexed signals of the present invention. The demultiplexer of FIG. 16 may also be used with conventional wave-division multiplexed signals. A signal 124 is directed in to the first filter 156A which is as described previously. Signal 124 may be either a hyper dense or conventional wave-division multiplexed signal. A local photonic source 180 produces an output signal 181, which is delivered to various shifters 182. The shifters 182 shift the signals to produce references 128 that are then fed to the filters 156 to produce individual outputs 175.

An arbitrary number of frequencies may be used. An arbitrary number of shifter and filter combinations are shown as shifters 182a through 182n and filters 156a through 156n. In certain embodiments, the reference signals 128 must be frequency and phase matched to the particular input frequency as shown in graphic A of FIG. 14. A detailed illustration of the shifter filter combination is shown in Box 186. An output signal 175 may be further processed. A portion of output signal 175 may be delivered to a phase and frequency locker and may then be fed through a feedback signal 187 to assist in controlling the frequency and phase of the shifted signal 128 through shifter 182.

FIG. 17 shows a detailed view of a channel separation assembly 186 of the present invention. As shown in FIG. 17, the hyper dense or conventional wave-division multiplex signal 124 enters into the drop filter 126. The drop filter 126 produces selected channel signal 175 and waste energy 134, which may be fed into the next filter, if desired. The operation of the embodiment of FIG. 17 is very similar to the operation of the embodiment of FIG. 12, except that the photonic source 160 of FIG. 12 is essentially replaced with the locking frequency shifter 182 of FIG. 17. Here, the local photonic signal 181 from the local photonic source 180 is directed through a shifting modulator 188, which is output to a phase modulator 192 to produce the reference signal 128 for a drop filter 126.

To shift the frequency using a shifting modulator 188, an oscillator 190 provides a subcarrier signal for shifting signal 181 down to the reference frequency of signal 128. The frequency in phase locker 194 operates similarly to the frequency and phase locking described in connection with FIG. 12. Here, the frequency and phase locker controls the frequency of oscillator 190 through control signal 196. The phase of signal 128 is controlled with phase modulator 192 through control signal 198 from the frequency and phase locker 194. The embodiments of FIGS. 16 and 17 constitute a demultiplexer capable of demultiplexing hyper dense wave-division multiplexed signals and conventional wave-division multiplexed signals to produce parallel separate outputs 175. Since the outputs 175 are photonic outputs, they can be interconnected with any kind of a photonic routing system. The outputs 176 can also be re-multiplexed using multiplexing means as described in connection with the embodiment of FIG. 14 or multiplexers similar thereto. As a result, a combination of components of the present invention can be used for hyper dense wave-division multiplexing, routing, organization, and reorganizing. Routing information can be extracted from the signals such as signal 175 to ensure the proper tuning and alignment of each channel separator assembly so the eventual result is a production of a hyper dense all optical network.

The present invention may be embodied in other specific forms with out departing from its spirit or essential characteristics. The described embodiments are to be considered in all respects only as illustrative, and not restrictive. The scope of the invention is, therefore, indicated by the appended claims, rather than by the foregoing description. All changes which come with in the meaning and range of equivalency of the claims are to be embraced with in their scope.

What is claimed and desired to be secured by United States Letters Patent is:

1. A method of non-symmetric photonic filtering comprising:

providing an input signal having first and second frequencies wherein the first frequency is modulated with information;

providing a first reference signal at the first frequency;

directing the input signal and the first reference signal to a first beam splitter characterized by a first proportioning parameter and configured to control the proportions of energy directed to first and second paths having respective first and second transit times of substantially equal duration;

splitting energy corresponding to the second frequency into first and second portions;

directing the first and second portions to the first and second paths, respectively;

producing interference between the first reference signal and the input signal at the first frequency at the first beam splitter to produce a constructive interference signal and a destructive interference signal corresponding thereto;

directing the constructive interference signal to the first path and the destructive interference signal to the second path;

directing energy from the first and second paths to a second beam splitter, configured to produce interference there between and having a second proportioning parameter non-complementary to the first proportioning parameter; and directing energy from the second beam splitter to third and fourth paths, the third path receiving energy resulting from constructive interference at the second frequency at the second beam splitter, with the fourth path receiving energy from the input signal, embodying the information therein at the first frequency, and energy from the first reference signal.

2. The method of claim 1, further comprising directing energy from the fourth path to a third beam splitter.

3. The method of claim 2, further comprising:

directing energy from a second reference signal at the first frequency to the third beam splitter;

producing, at the third beam splitter, destructive interference between the second reference signal and the energy from the first reference signal to produce a fifth output having energy from the input signal embodying the information.

4. The method of claim 3, further comprising dynamically controlling the first frequency corresponding to the first and second reference signals to provide an active filter.

5. The method of claim 4, further comprising providing computer control of the first and second reference signals to provide programmable, dynamically controlled filtering.

6. The method of claim 1, further comprising:

providing first and second non-symmetric photonic filters configured to produce non-symmetric photonic filtering; and operably connecting the first and second non-symmetric photonic filters to select out the first frequency with the first non-symmetric photonic filter and the second frequency with the second non-symmetric photonic filter.

7. The method of claim 6, further comprising providing the first and second reference signals of the second non-symmetric photonic filter at the second frequency.

8. The method of claim 7, wherein operably connecting further comprises connecting the first and second non-symmetric photonic filters to receive the input signal in parallel.

9. The method of claim 7, wherein operably connecting further comprises connecting the first and second non-symmetric photonic filters to process energy from the input signal in series.

10. The method of claim 9, wherein operably connecting further comprises providing energy from the third path of the first non-symmetric photonic filter as the input signal to the second non-symmetric photonic filter.

11. The method of claim 6, wherein the input signals to the first and second non-symmetric photonic filters are hyper-dense, wave-division multiplexed signals.

12. The method of claim 11, wherein the input signals to the first and second non-symmetric photonic filters are derived from a common signal.

13. The method of claim 12, wherein the input signals to the first and second non-symmetric photonic filters are the common signal.

14. The method of claim 12, wherein only the input signal to the first non-symmetric photonic filters is the common signal.

15. The method of claim 1, wherein the input signal is a hyper-dense signal.

* * * * *